United States Patent
Bu et al.

(10) Patent No.: US 8,666,946 B2
(45) Date of Patent: Mar. 4, 2014

(54) INCREMENTAL QUANTILE TRACKING OF MULTIPLE RECORD TYPES

(75) Inventors: Tian Bu, Basking Ridge, NJ (US); Jin Cao, Edison, NY (US); Aiyou Chen, New Providence, NJ (US); Li Li, Edison, NJ (US)

(73) Assignee: Alcatel Lucent, Paris (FR)

( * ) Notice: Subject to any disclaimer, the term of this patent is extended or adjusted under 35 U.S.C. 154(b) by 359 days.

(21) Appl. No.: 12/546,344

(22) Filed: Aug. 24, 2009

(65) Prior Publication Data
US 2011/0010337 A1   Jan. 13, 2011

Related U.S. Application Data

(60) Provisional application No. 61/224,704, filed on Jul. 10, 2009.

(51) Int. Cl.
  G06F 17/18  (2006.01)
  G06F 17/30  (2006.01)

(52) U.S. Cl.
  USPC ............................. 707/688; 702/180; 706/50

(58) Field of Classification Search
  CPC ..................................................... G06F 17/18
  USPC ............................. 707/688; 702/180; 706/50
  See application file for complete search history.

(56) References Cited

U.S. PATENT DOCUMENTS

| | | | |
|---|---|---|---|
| 6,108,658 A | | 8/2000 | Lindsay et al. |
| 6,820,090 B2 * | | 11/2004 | Chambers et al. ...... 707/999.101 |
| 7,076,487 B2 * | | 7/2006 | Liechty et al. ......... 707/999.002 |
| 7,076,695 B2 * | | 7/2006 | McGee et al. ............... 714/47.2 |
| 7,219,034 B2 | | 5/2007 | McGee et al. |
| 7,313,092 B2 * | | 12/2007 | Lau et al. ...................... 370/230 |
| 8,000,929 B2 * | | 8/2011 | Bakshi et al. ................. 702/180 |
| 2008/0091691 A1 | | 4/2008 | Tsuji |
| 2009/0271508 A1 * | | 10/2009 | Sommers et al. ............ 709/224 |
| 2010/0114526 A1 * | | 5/2010 | Hosking ....................... 702/181 |
| 2010/0292995 A1 * | | 11/2010 | Bu et al. ......................... 705/1.1 |

OTHER PUBLICATIONS

John M. Chambers et al., "Monitoring Networked Applications with Incremental Quantile Estimation", Statistical Science, vol. 21, No. 4 (2006), pp. 463-475.*
Ichiro Takeuchi et al., "Nonparametric Quantile Estimation", Journal of Machine Learning Research, vol. 7 (2006), pp. 1231-1264.*
Anna C. Gilbert et al., "Domain-Driven Data Synopses for Dynamic Quantiles", IEEE Transactions on Knowledge and Data Engineering (Jul. 2005), 17(7):927-938.*
Jin Cao, et al., Incremental Tracking of Multiple Quantiles for Network Monitoring in Cellular Networks, MICNET '09, Sep. 21, 2009, Beijing, China.
Fei Chen et al., "Incremental Quantile Estimation for Massive Tracking," Proc. of the Sixth International Conference on Knowledge Discovery and Data Mining, 2000, pp. 516-522.
Moller et al., "Time-adaptive Quantile Regression," Jan. 2006, Computational Statistics & Data Analysis, vol. 52, Issue 3, pp. 1292-1303.

* cited by examiner

*Primary Examiner* — Rehana Perveen
*Assistant Examiner* — Scott A Waldron
(74) *Attorney, Agent, or Firm* — Wall & Tong, LLP

(57) ABSTRACT

A method and apparatus are provided for incrementally tracking quantiles in the presence of multiple record types. A method for performing incremental quantile tracking includes receiving a first data record of a first record type and a second data record of a second record type, and updating a quantile probability for a quantile value, based on the first record type of the first data record and the second record type of the second data record, to obtain a new quantile probability for the quantile value.

20 Claims, 10 Drawing Sheets

INCREMENTAL QUANTILE TRACKING OF MULTIPLE RECORD TYPES

CROSS-REFERENCE TO RELATED APPLICATIONS

This application claims the benefit of U.S. Provisional Patent Application Ser. No. 61/224,704, filed Jul. 10, 2009, entitled "INCREMENTAL TRACKING OF MULTIPLE QUANTILES" which is hereby incorporated by reference herein in its entirety. This application is related to U.S. patent application Ser. No. 12/546,255, filed Aug. 24, 2009, entitled "METHOD AND APPARATUS FOR INCREMENTAL TRACKING OF MULTIPLE QUANTILES," which is hereby incorporated by reference herein in its entirety.

FIELD OF THE INVENTION

The invention relates to the field of quantile tracking and, more specifically but not exclusively, to incremental quantile tracking.

BACKGROUND

Quantiles are useful in characterizing the data distribution of evolving data sets. For example, quantiles are useful in many applications, such as in database applications, network monitoring applications, and the like. In many such applications, quantiles need to be tracked dynamically over time. In database applications, for example, operations on records in the database, e.g., insertions, deletions, and updates, change the quantiles of the data distribution. Similarly, in network monitoring applications, for example, anomalies on data streams need to be detected as the data streams change dynamically over time. Computing quantiles on demand is quite expensive, and, similarly, computing quantiles periodically can be prohibitively costly as well. Thus, it is desirable to compute quantiles incrementally in order to track quantiles of the data distribution.

Most incremental quantile estimation algorithms are based on a summary of the empirical data distribution, using either a representative sample of the distribution or a global approximation of the distribution. In such incremental quantile estimation algorithms, quantiles are computed from summary data. Disadvantageously, however, in order to obtain quantile estimates with good accuracies (especially for tail quantiles, for which the accuracy requirement tends to be higher than for non-tail quantiles), a large amount of summary information must be maintained, which tends to be expensive in terms of memory. Furthermore, for continuous data streams having underlying distributions that change over time, a large bias in quantile estimates may result since most of the summary information is out of date.

By contrast, other incremental quantile estimation algorithms use a stochastic approximation (SA) for quantile estimation, in which the data is viewed as being quantities from a random data distribution. The SA-based quantile estimation algorithms do not keep a global approximation of the distribution and, thus, use negligible memory for estimating tail quantiles. Disadvantageously, however, the existing SA-based quantile estimation algorithms are only valid for a single record type (namely, insertion records), and are unable to handle multiple record types, such as when insertion records are accompanied by one or more of deletion records, correction records, and update records.

SUMMARY

Various deficiencies in the prior art are addressed through methods, apparatuses, and computer readable mediums for performing incremental tracking of quantiles in the presence of multiple record types.

In one embodiment, a method for performing incremental quantile tracking includes receiving a first data record of a first record type having a first data value, determining whether a second data record of a second record type is received, determining an initial distribution function, updating the initial distribution function to form a new distribution function based on the first data value and whether a second data record is received, generating an approximation of the new distribution function, determining at least one new quantile estimate associated with at least one new probability of the new distribution function using the approximation of the new distribution function, and storing the at least one new quantile estimate and the at least one new probability associated with the at least one new quantile estimate. The initial distribution function includes a plurality of initial quantile estimates and a plurality of initial probabilities associated with the initial quantile estimates. The new distribution function includes a plurality of quantile points identifying the initial quantile estimates and a respective plurality of probabilities, where the probabilities include at least one new probability updated from at least one of the initial probabilities, respectively. The approximation of the new distribution function is generated by updating, for each of at least one of the quantile points in the new distribution function, a region of the new distribution function associated with the at least one of the quantile points. For each of the at least one new probability, a respective new quantile estimate that is associated with the new probability is determined using the approximation of the new distribution function.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

A capability for incremental tracking of quantiles using stochastic approximation (SA), denoted as an SA-based incremental quantile estimation capability, is depicted and described herein. In general, in incremental quantile estimation, quantiles for a set of data are updated in real-time or near-real time as data is received, such that the incremental quantile estimation provides a relatively current estimate of the quantiles for the set of data received up to the current time. The SA-based incremental quantile estimation capability enables incremental quantile tracking in the presence of multiple record types, such as insertion records, deletion records, correction records, update records, and the like. The SA-based incremental quantile estimation capability enables incremental quantiles tracking in the presence of multiple record types for single-quantile SA-based algorithms and for multiple-quantile SA-based algorithms. The SA-based incremental quantile estimation capability is adaptive to changes in the data distribution. The SA-based incremental quantile estimation capability only needs to track quantiles of interest and, thus, is memory efficient (as opposed to non-SA-based quantile estimation algorithms in which the memory requirements are dependent on which quantile is being estimated, e.g., tail quantiles require more memory).

Figure 1:
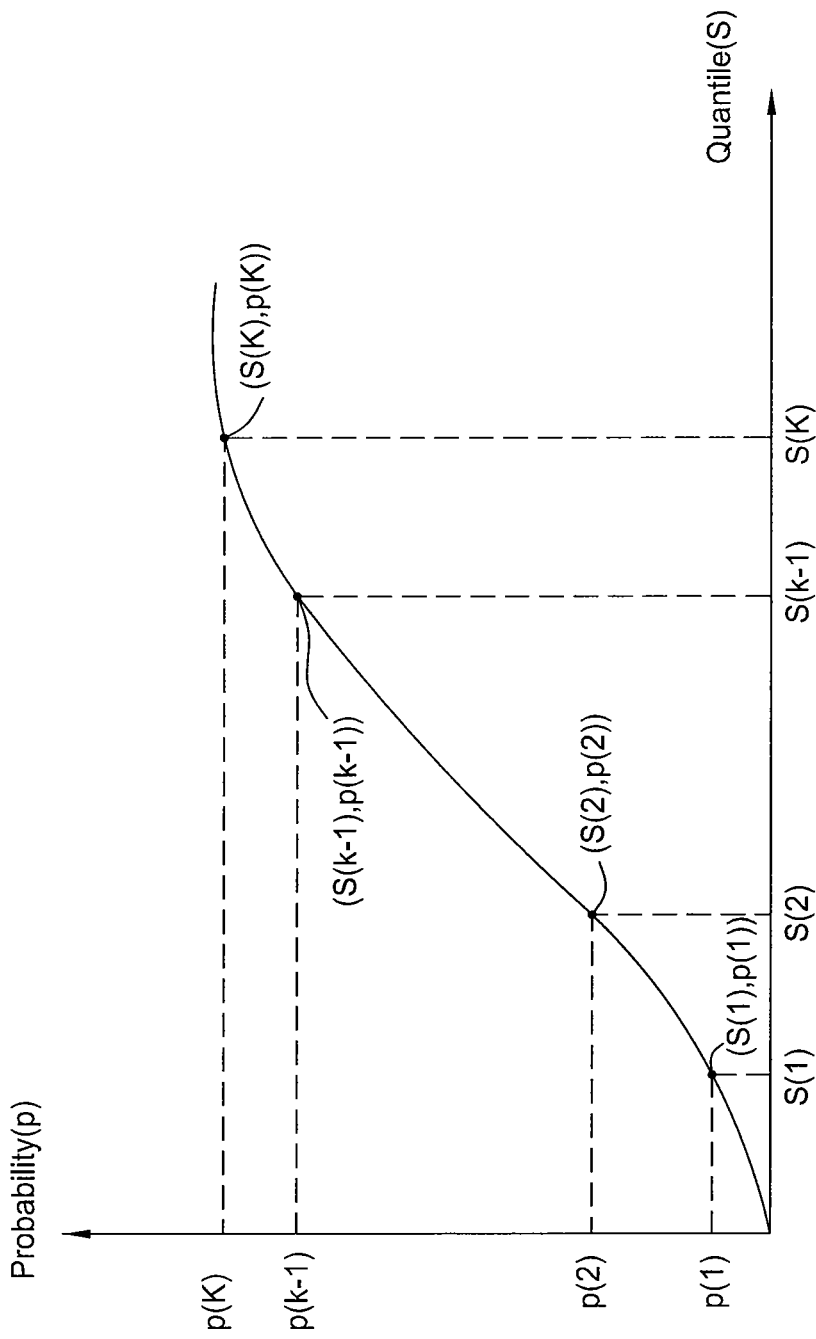
FIG. 1 depicts an exemplary estimated cumulative distribution function (CDF) for use in responding to queries for quantile estimates.

FIG. 1 depicts an exemplary estimated cumulative distribution function (CDF) for use in responding to queries for quantile estimates. The exemplary estimated CDF 100, denoted as distribution function $F(x)$, represents a distribution of a set of received data values $\{x\}$. The distribution function $F(x)$ is represented using a Cartesian coordinate system in which the x-axis indicates the values of the quantile estimates of the distribution function $F(x)$ (which are denoted as quantile estimates $S=(S(1), S(2), \ldots, S(K))$) and the y-axis indicates the values of the probabilities associated with the quantile estimates S (which are denoted as probabilities $p=(p(1), p(2), \ldots, p(K))$). A combination of the quantile estimates S and the associated probabilities p provides a set of quantile points which define the distribution function $F(x)$ (namely, distribution function $F(x)$ is represented using the quantile points $\{((S(1),p(1)), ((S(2),p(2)), \ldots, ((S(K),p(K)))\}$. The distribution function $F(x)$ is a strictly monotone function (i.e., such that $S(1)<S(2)<\ldots<S(K)$), and has positive derivatives on its domain.

The SA-based incremental quantile estimation capability depicted and described herein tracks the estimated quantiles of distribution function $F(x)$ using an incremental approximation to distribution function $F(x)$ upon receiving new data values. At a current time t, at least one data record is received. The at least one data record includes an insertion record having an insertion data value $x_t$ received at time t and, optionally, may include one or more other records, such as (1) a deletion record identifying a deletion data value, associated with a previously received insertion record, to be deleted; (2) a correction record identifying a correction data value, associated with a previously received insertion record, to be used to correct a previous data value; (3) an update record identifying an update data value, associated with a previously received insertion record, to be used to update a previous data value; and the like. These record types are defined in additional detail below. As described herein, the SA-based incremental quantile estimation capability updates the incremental approximation to the distribution function $F(x)$ based on the received data value(s), such that the quantile estimates are denoted as $S_t=(S_t(1), S_t(2), \ldots, S_t(K))$ and probabilities associated with the quantile estimates $S_t$ are denoted as probabilities $p_t=(p_t(1), p_t(2), \ldots, p_t(K))$.

The SA-based incremental quantile estimation capability depicted and described herein, which supports incremental quantile estimation for multiple record types, may be better understood by (1) considering a general application of SA to quantile estimation, (2) considering an updating of the general application of SA to quantile estimation using a geometric interpretation of the general application of SA to quantile estimation, and (3) providing an extension of the general application of SA to quantile estimation for handling multiple record types.

In the general application of SA to quantile estimation, assume that there are no general updates to the set of received data values. Let $\{x_t\}$ be the set of received data values, which have a distribution $F_t$ at time t. Let p be a probability whose quantile is of interest, and let $\theta_t$ be the true quantile of distribution function $F_t$ with respect to the probability p. The true quantile $\theta_t$ is estimated by letting $S_{t-1}$ be the quantile estimate at time t−1 and, with the arrival of the data value $x_t$ at time t, updating the quantile estimate $S_{t-1}$ as follows: $S_t=S_{t-1}+a_t(p-I(x_t \leq S_{t-1}))$, where $a_t>0$ is a pre-defined sequence of positive numbers, and $I(\cdot)$ is an indicator function. The sequence $a_t$ may be re-expressed in terms of the distribution density at the true quantile $\theta_t$ as follows: $S_t=S_{t-1}+f_t^{-1}w_t(p-I(x_t \leq S_{t-1}))$, where $f_t=F_t'(\theta)>0$ is the density of distribution function $F_t$ at the true quantile $\theta_t$ and $w_t$ is a weight associated with data value $x_t$.

In this general application of SA to quantile estimation, when the data distribution $F_t$ is stationary (i.e., $F_t=F$) and, thus, the density $f_t=f$, the following three lemmas give the convergence properties of the SA-based quantile estimate in $S_t=S_{t-1}+f_t^{-1}w_t(p-I(x_t \leq S_{t-1}))$, for certain choices of weights $w_t$:

Lemma 1: If $\Sigma_t w_t=\infty$, and $\Sigma_t w_t^2<\infty$, then the SA-based quantile estimate will converge, with probability one, to true quantile $\theta$.

Lemma 2: When $w_t=\alpha t^{-1}$ (thus satisfying the convergence condition in Lemma 1), then as $t\to\infty$, $\sqrt{t}(S_t-\theta)$ will converge to a normal distribution with mean zero and a fixed variance. In addition, the variance will be minimized when $w_t=1/t$ (diminishing weights), with a value of $\sigma^2/f^2$, where $\sigma$ is the variance of the stationary distribution. This second lemma concerns a special instance of the weights considered in the first lemma.

Lemma 3: For a constant weight $w_t=w$, where $w>0$ is a small fixed constant, $S_t-\theta$ converges in distribution to a random variable with mean zero and fixed variance, as $t\to\infty$.

When the data distribution (i.e., distribution function $F_t$) changes over time, the diminishing weights considered in Lemma 1 and Lemma 2 are no longer appropriate, because these weights cannot adapt to changes in the data distribution. In this case, constant weights may be used to track the true quantiles $\theta_t$ with respect to probability p. It will be appreciated that distribution function $F_t$ is not known, and, thus, the derivative $f_t$ at the true quantile $\theta_t$ is not known exactly; however, the derivative $f_t$ at the true quantile $\theta_t$ may be estimated from the data. It will be further appreciated that an accurate estimate of $f_t$ is not crucial because, as seen from Lemma 2, for stationary data an accurate estimate of $f_t$ does not affect the convergence but only the speed of convergence rate. However, if the true derivative f is close to zero, such as at the tails of the data distribution, the estimate may become unstable.

For non-stationary data, the derivative $f_t$ can be estimated from the data using an exponentially weighted average with the same weight w.

When the data distribution (i.e., distribution function $F_t$) is stationary, the diminishing weights considered in Lemma 1 and Lemma 2 asymptotically perform better than the constant weight choice considered in Lemma 3, as the quantile estimate with diminishing weights converges to the true quantile but the estimate with constant weights only converges to a distribution with the true quantile as its mean. It will be appreciated, however, that use of constant weights still may be beneficial, because use of constant weights gives a good estimate and is less prone to bad initial values. It will be further appreciated that, with diminishing weights (1/t), Lemma 2 gives the rate of convergence of the quantile estimate $S_t$ to the true quantile $\theta$ with error of $O(t^{-1/2})$; whereas, for constant weights, convergence may be relatively weak.

As described hereinabove, the general application of SA to quantile estimation may be updated using geometric interpretation, a description of which follows.

In this geometric interpretation, assume that $f_t=F_t(\theta_t)$ is known and, given observations of data records received up to time t−1, denote $S_{t-1}$ as the initial quantile estimate for probability p, i.e. $P(x \leq S_{t-1}) \approx p$. Given a new data record having a data value $x_t$ with associated weight $w_t$, the probability $P(x \leq S_{t-1})$ can be updated as follows: $P(x \leq S_{t-1}) \approx (1-w_t)p + w_t I(x_t \leq S_{t-1}) = p_t$. Given the distribution derivative $f_t$, the distribution function $F_t$ can be approximated locally at quantile point $(S_{t-1}, p_t)$ using a linear function with slope $f_t$, as follows: $F_t(x) \approx (1-w_t)p + w_t I(x_t \leq S_{t-1})) + (x - S_{t-1}) f_t$. Then, setting this equal to probability p, new quantile estimate $S_t$ is determined using: $S_t = S_{t-1} + w_t/f_t (p - I(x_t \leq S_{t-1}))$. In other words, the new quantile estimate based on data value $x_t$ is essentially derived from a local approximation of distribution function $F_t$ at quantile point $(S_{t-1}, P_t)$. This local approximation, which is quite simple (i.e., a linear function), is incrementally updated with every new insertion record. Thus, this SA-based approach to quantile estimation is quite different than non-SA-based approaches to quantile estimation that attempt to build a global approximation using data summaries. Furthermore, due to the simplicity of this SA-based approach to quantile estimation, there is essentially no memory requirement for incrementally tracking quantiles (even for tail quantiles).

In continuation of this geometric interpretation, let $w_t$ be the weight associated with data value $x_t$ and let c>0 be a tuning parameter. The general application of SA to quantile estimation may be summarized using this geometric interpretation as follows. At time t, let the initial quantile estimate be denoted as $S_{t-1}$, let the initial density estimate be denoted as $f_{t-1}$, and let the incoming data value be denoted as $x_t$. The probability $p_t$ associated with initial quantile estimate $S_{t-1}$ is determined as follows: $p_t = (1-w_t)p + w_t I(S_{t-1} \leq x_t)$. A local linear approximation of distribution function $F_t$ at quantile point $(S_{t-1}, p_t)$ is constructed using a line with a slope given by the initial density estimate $f_{t-1}$. The initial quantile estimate $S_{t-1}$ is updated to determine the new quantile estimate $S_t$ by the solution to $F_t(S_t)=p$. The initial derivative estimate $f_{t-1}$ is updated to new derivative estimate $f_t$ as follows: $f_t = (1-w_t) f_{t-1} + w_t I(|x_t - S_t| \leq c)/\{2c\}$.

The SA-based incremental quantile estimation capability depicted and described herein, may be better understood by considering an extension of the general application of SA to quantile estimation for handling multiple record types. The SA-based incremental quantile estimation capability is depicted and described herein within the context of an embodiment in which four types of data records are supported: insertions, deletions, corrections, and updates. A description of these record types follows:

Insertion: At time index t, a new data value $x_t$ is inserted, meaning that $x_t$ is considered to be a new data record received at time t.

Deletion: At time index t, a previously received data value $x_{t'}$, t'<t is deleted, meaning that $x_{t'}$ is no longer considered to be a valid record at time t.

Correction: At time index t, a previously received data value $x_{t'}$, t'<t is corrected with a new data value x', meaning that the previously received data value $x_{t'}$ is erroneous, and, thus, should be replaced with the correct data value x'.

Update: At time index t, a previously received data value $x_{t'}$, t'<t is updated with a new data value $x'_{t'}$, meaning that the value of $x_{t'}$ at time t' should no longer be considered to be a valid record. Instead, a new record, with a new data value x', is generated at time t.

As indicated above, in describing the four record types, a distinction has been drawn between a correction record and an update record, where both types of operations result in an adjustment to a previously received data value. A difference between corrections and updates, however, is that, after an adjustment, a corrected data value is still considered to be an old record, but an updated data value is considered to be a new record (i.e., an update at time t is equivalent to a deletion of the old record and an insertion of a new record). While such a distinction between a correction record and an update record may not be important for non-time-sensitive applications in which all of the valid data records at time t are considered equivalent, the distinction may be important for time-sensitive applications in which more recently received data records are considered to have a greater importance that less recently received data records. The differences between correction records and update records may be better understood by considering an exemplary application of SA-based incremental quantile tracking: namely, network flow monitoring. For example, in network flow monitoring, for data updates, a flow record is updated upon an arrival of its packet at time t (e.g., the number of packets of the flow will be incremented by one) and, thus, the old flow size is not wrong, but is no longer valid at time t, because instead there is a new flow record with an updated size. Although primarily explained with respect to a specific type of application, it will be appreciated that the distinction between correction records and update records also is valid for many other applications of SA-based incremental quantile tracking. From the above discussion, it will be appreciated that, since a data update at time t is equivalent to a combination of a deletion and an insertion, without loss of generality, update records do not need to be considered for purposes of describing embodiments of the SA-based incremental quantile estimation capability. Thus, embodiments of the SA-based incremental quantile estimation capability may be described by considering only three types of data records: insertions, deletions, and corrections.

In order to simplify the description of the SA-based incremental quantile estimation capability, based on the above discussion regarding corrections and updates, assume that the set of data records for which SA-based incremental quantile approximation is performed includes only three types of records: namely, insertion records, deletion records, and correction records.

In order to further simplify the description of the SA-based incremental quantile estimation capability, assume that at time t there is always a data value $x_t$ inserted, and that at the same time there also could be one or more of the following dynamic adjustments to previous data values: (1) a data value $x_{t_0}$ from a previous time $t_0$ ($t_0 < t$) that will be deleted (i.e., the data value is no longer considered), or (2) a data value $x_{t_1}$ from a previous time $t_1$ ($t_1 < t$) that will be corrected with a new data value $x'_{t_1}$ (i.e., the data record having data value $x_{t_1}$ at time $t_1$ should be replaced by new data value $x'_{t_1}$).

In the simplified environment presented above, given that $F_t$ is the data distribution function of the set of data values $\{x_t\}$, which is subject to these dynamic adjustments (deletions and corrections), the SA-based incremental quantile estimation capability enables incremental tracking of the quantiles of $F_t$ with respect to a probability p.

In order to better understand the manner in which the SA-based incremental quantile estimation capability enables incremental estimation of the quantiles of distribution function $F_t$ with respect to a probability p in such a simplified environment, consider only deletion records for the moment. The difficult with deletion records is in reversing the effect of the insertion of that data value at an earlier time. The manner in which this difficulty may be dealt with may be better understood by reconsidering the geometric interpretation of the general application of SA to quantile estimation for insertion of a data value and deletion of a data value.

With respect to insertion, at time t−1, the approximation of the distribution is given by initial distribution function $\hat{F}_{t-1}$. At time t, an inserted data value $x_t$ represents a point mass distribution function, i.e., $I(x \geq x_t)$, and with insertion of data value $x_t$ having associated weight $w_t$, an adjusted approximation of the initial distribution function $\hat{F}_{t-1}(x)$ is determined by the following weighted average: $\hat{F}_t(x) \leftarrow (1-w_t)\hat{F}_{t-1}(x) + w_t I(x \geq x_t)$, where $\hat{F}_t(x)$ is denoted as a new distribution function. This equation may then be used to adjust the initial probability $p_{t-1}$ associated with the initial quantile estimate $S_{t-1}$ to obtain new probability $p_t$ associated with the initial quantile estimate $S_{t-1}$. The new quantile estimate $S_t$ associated with new probability $p_t$ may then be determined by using a linear approximation to obtain an approximation of new distribution function $\hat{F}_t$. The linear approximation is a continuity adjustment of new distribution function $\hat{F}_t(x)$ in $\hat{F}_t(x) \leftarrow (1-w_t)\hat{F}_{t-1}(x) + w_t I(x \geq x_t)$, as it is not a continuous function that is desired.

With respect to deletion, first assume that prior to time t there has been no deletion, but that there will be a deletion of data value $x_t$ (i.e., the most recently inserted data value) immediately after its insertion. In this case, the effect of the insertion of data value $x_t$ at time t is reversed at time t using: $\hat{F}_t(x) \leftarrow (1-w_t)^{-1}(\hat{F}_t(x) - w_t I(x \geq x_t))$, where $\hat{F}_t(x)$ is the approximation of the new distribution function as described above. It will be appreciated that, if there is no local line approximation of $\hat{F}_t(x)$ (i.e., $\hat{F}_t(x)$ on the right hand side of $\hat{F}_t(x) \leftarrow (1-w_t)^{-1}$ $(\hat{F}_t(x) - w_t I(x \geq x_t))$ is actually the adjusted approximation of the distribution function given by $\hat{F}_t(x) \leftarrow (1-w_t)\hat{F}_t(x) - w_t I(x \geq x_t)$), then $\hat{F}_t(x) \leftarrow (1-w_t)^{-1}(\hat{F}_t(x) - w_t I(x \geq x_t))$ may be used to obtain the following result: $\hat{F}_t(x) = \hat{F}_{t-1}(x)$. It will be further appreciated that the above holds approximately true due to the local line approximation of new distribution function $\hat{F}_t(x)$.

Further with respect to deletion, now consider the case in which, at time t, rather than deleting the currently received insertion data value $x_t$, a previously received data value (denoted as $x_{t_0}$, $t_0 < t$) is deleted. From $\hat{F}_t(x) \leftarrow (1-w_t)^{-1}(\hat{F}_t(x) - w_t I(x \geq x_t))$, it is apparent that the initial weight $w_{t_0}$ of data value $x_{t_0}$ at time $t_0$ diminishes after each sub-sequent insertion of data values (i.e., $x_{t_0+1}, \ldots, x_t$), such that, at time t, the weight is reduced to $w_t^{new} = w_{t_0} \Pi_{s=t_0+1}^{t}(1-w_s)$. Thus, in order to delete data value $x_{t_0}$ at time t, the new distribution function $\hat{F}_t(x)$ (i.e., the result of updating the initial distribution function $\hat{F}_{t-1}(x)$ based on the insertion data value $x_t$ received at time t) is further updated based on the deletion data value $x_{t_0}$ using: $\hat{F}_t(x) \leftarrow (1-w_t^{new})^{-1}(\hat{F}_t(x) - w_t^{new} I(x \geq x_t))$.

A general description of an embodiment of the single-quantile SA-based incremental quantile estimation capability follows.

In this embodiment, as in the above description, assume that the set of data records for which incremental quantile approximation is performed includes insertion records, deletion records, and correction records.

In this embodiment, assume that at time t there is always a data value $x_t$ that is inserted, but at the same time there also could be one or both of: (1) a data value $x_{t_0}$ from a previous time $t_0$ that will be deleted (i.e., the data value is no longer to be considered), and (2) a data value $x_{t_1}$ from a previous time $t_1$ that will be corrected with a new data value $x'_{t_1}$ (i.e., the data value $x_{t_1}$ at time $t_1$ should be replaced by new data value $x'_{t_1}$).

In this embodiment, let $w_t$ be a sequence of intended or initial weights for the insertion data value $x_t$ at time t. The weights for the insertion data value $x_t$ are deemed to be intended or initial, because the actual weights for the insertion data value $x_t$ will be modified due to deletion. For deletion data value $x_{t_0}$, the intended weight at time t is: $d_{t_0}(t) = w_{t_0} \Pi_{s=t_0+1}^{t}(1-w_s)$.

In this embodiment, in order to reverse the effects of earlier insertions when later deletions and corrections are performed, the total weights from deleted data values at time t (denoted as $D_t$) is tracked. As such, due to deletion, the total weights of data that contributed to new distribution function $\hat{F}_t$ at time t is not one, but, rather, is $1-D_t$.

In this embodiment, assume that the approximation of the distribution function at time t−1 is denoted as $\hat{F}_{t-1}$. Additionally, define an initial total weights value $D_0 = 0$. The approximation of the distribution function at time t−1 is the initial distribution function $\hat{F}_{t-1}$ at time t. The initial distribution function $\hat{F}_{t-1}$ is updated to form the new distribution function $\hat{F}_t$ by updating the initial probability $p_{t-1}$ to form new probability $p_t$. Additionally, the initial total weights value $D_{t-1}$ is updated to form new total weights value $D_t$.

At time t, with the insertion record including insertion data value $x_t$, updating of the initial distribution function $\hat{F}_{t-1}$ and the initial total weights value $D_{t-1}$ may be represented as follows:

$$\text{Insert:} \begin{cases} \hat{F}_t(x) & \leftarrow & \dfrac{(1-w_t)(1-D_{t-1})\hat{F}_{t-1}(x) + w_t I(x \geq x_t)}{1 - D_{t-1}(1-w_t)} \\ D_t & \leftarrow & (1-w_t)D_{t-1} \end{cases}$$

If there are no deletion or correction records at time t, the updating of the initial distribution function $\hat{F}_{t-1}$ is complete (because no further update of the initial distribution function $\hat{F}_{t-1}$ is required at time t).

If there is a deletion record or a correction record at time t, the updated distribution function $\hat{F}_t$ that is generated based on the insertion record is further updated to account for the deletion or correction.

At time t, if there is a deletion record indicating deletion of data value $x_{t_1}$, then: (a) the updated distribution function $\hat{F}_t$ that is generated based on the insertion data value from the insertion record is further updated based on the deletion record in order to represent the new distribution function $\hat{F}_t$, and (b) the updated total weights value $D_t$ that is generated based on the weight of the insertion data value from the insertion record is further updated based on the deletion record in order to represent the new total weights value $D_t$. The further updating of the updated distribution function $\hat{F}_t$ and the updated total weights value $D_t$ based on the deletion record may be represented as follows:

$$\text{Delete:} \begin{cases} \hat{F}_t(x) \leftarrow \dfrac{(1-D_t)F_t(x) - d_{t_0}I(x \geq x_{t_0})}{1 - D_t - d_{t_0}} \\ D_t \leftarrow D_t + d_{t_0}(t) \end{cases}$$

where $d_{t_0}(t)$ is determined as $d_{t_0}(t) = w_{t_0} \Pi_{s=t_0+1}^{t}(1-w_s)$. It will be appreciated that these deletion equations remove the influence of data value $x_{t_0}$ at time t since the weight for data value $x_{t_0}$ now reduces to $d_{t_0}(t)$.

At time t, if there is a correction record indicating correction of data value $x_{t_0}$ at time t with a new value $x_{t_1}$, then: (a) the updated distribution function $\hat{F}_t$ that is generated based on the insertion data value from the insertion record is further updated based on the correction record in order to represent the new distribution function $\hat{F}_t$, and (b) the updated total weights value $D_t$ that is generated based on the weight of the insertion data value from the insertion record remains unchanged. The further updating of the updated distribution function $\hat{F}_t$ based on the correction record may be represented as follows:

$$\text{Correction:} \begin{cases} \hat{F}_t(x) \leftarrow \dfrac{(1-D_t)F_t(x) + d_{t_1}(I(x \geq x_{t_1}) - I(x \geq x'_{t_1}))}{1 - D_t} \\ D_t \quad \text{remains unchanged} \end{cases}$$

For the insertion equations, with the arrival of new data value $x_t$, the updated distribution function $\hat{F}_t$ is the weighted sum $I(x \geq x_{t-1})$ from insertion data value $x_t$ with weight $w_t$, and initial distribution function $\hat{F}_{t-1}$ with weight $(1-w_t)(1-D_{t-1})$, normalized to have a total weight of one. Additionally, the weight of the deleted data in $\hat{F}_t$ is updated by a factor of $(1-w_t)$.

As described hereinabove, from the above-described equations, the equations adapted for use in updating the initial probability $p_{t-1}$ to form the new probability $p_t$ may be derived. Namely, the equations for use in updating initial probability $p_{t-1}$ to form new probability $p_t$ may be derived by evaluating the new distribution function $\hat{F}_t$ at the initial quantile estimate $S_{t-1}$ at time t-1.

The initial probability $p_{t-1}$ is updated to form the new probability $p_t$ as follows (where an assumption is made that initial total weights value $D_0 = 0$).

At time t, with the insertion record including insertion data value $x_t$: (a) the initial probability $p_{t-1}$ is updated to form an intermediate probability $p_t^{INT}$, and (b) and the initial total weights value $D_{t-1}$ is updated to form an intermediate total weights value $D_t^{INT}$, as follows:

Insert:
$$\begin{cases} p_t^{INT} \leftarrow (1 - D_{t-1}(1-w_t))^{-1}((1-w_t)(1-D_{t-1})p_{t-1} + w_t I(S_{t-1} \geq x_t)) \\ D_t^{INT} \leftarrow (1-w_t)D_{t-1} \end{cases}$$

If there are no deletion or correction records at time t, the intermediate probability $p_t^{INT}$ is denoted as new probability $p_t$ (because no further update of the probability is required at time t).

If there is a deletion record or a correction record at time t, the intermediate probability $p_t^{INT}$ is further updated, based on the deletion or update, in order to determine new probability $p_t$.

At time t, if there is a deletion record indicating deletion of data value $x_{t_0}$ then: (a) the intermediate probability $p_t^{INT}$ determined based on the insertion record is further updated based on the deletion record in order to determine new probability $p_t$, and (b) the intermediate total weights value $D_t^{INT}$ that is generated based on the weight of the insertion data value from the insertion record is further updated based on the deletion record in order to determine the new total weights value $D_t$. The further updating of the intermediate probability $p_t^{INT}$ and the intermediate total weights value $D_t^{INT}$ based on the deletion record is performed as follows:

$$\text{Delete:} \begin{cases} p_t \leftarrow (1 - D_t^{INT} - d_{t_0})^{-1}((1 - D_t^{INT})p_t^{INT} - d_{t_0}I(S_{t-1} \geq x_{t_0})) \\ D_t \leftarrow D_t^{INT} + d_{t_0}(t) \end{cases}$$

where $d_{t_0}(t)$ is $d_{t_0}(t) = w_{t_0} \Pi_{s=t_0+1}^{t}(1-w_s)$.

At time t, if there is a correction record indicating correction of data value $x_{t_0}$ at time t with a new value $x_{t_1}$: (a) the intermediate probability $p_t^{INT}$ determined based on the insertion record is further updated based on the correction record in order to determine new probability $p_t$, and (b) the intermediate total weights value $D_t^{INT}$ that is generated based on the weight of the insertion data value remains unchanged (i.e., the new total weights value $D_t$ is the intermediate total weights value $D_t^{INT}$. The further updating of the intermediate probability $p_t^{INT}$ based on the correction record is performed as follows:

Correction: $p_t \leftarrow (d_{t_1}(I(S_{t-1} \geq x_{t_1}) - I(S_{t-1} \geq x'_{t_1})) + (1 - D_t^{INT})p_t^{INT})(1 - D_t^{INT})^{-1}$.

Figure 2:
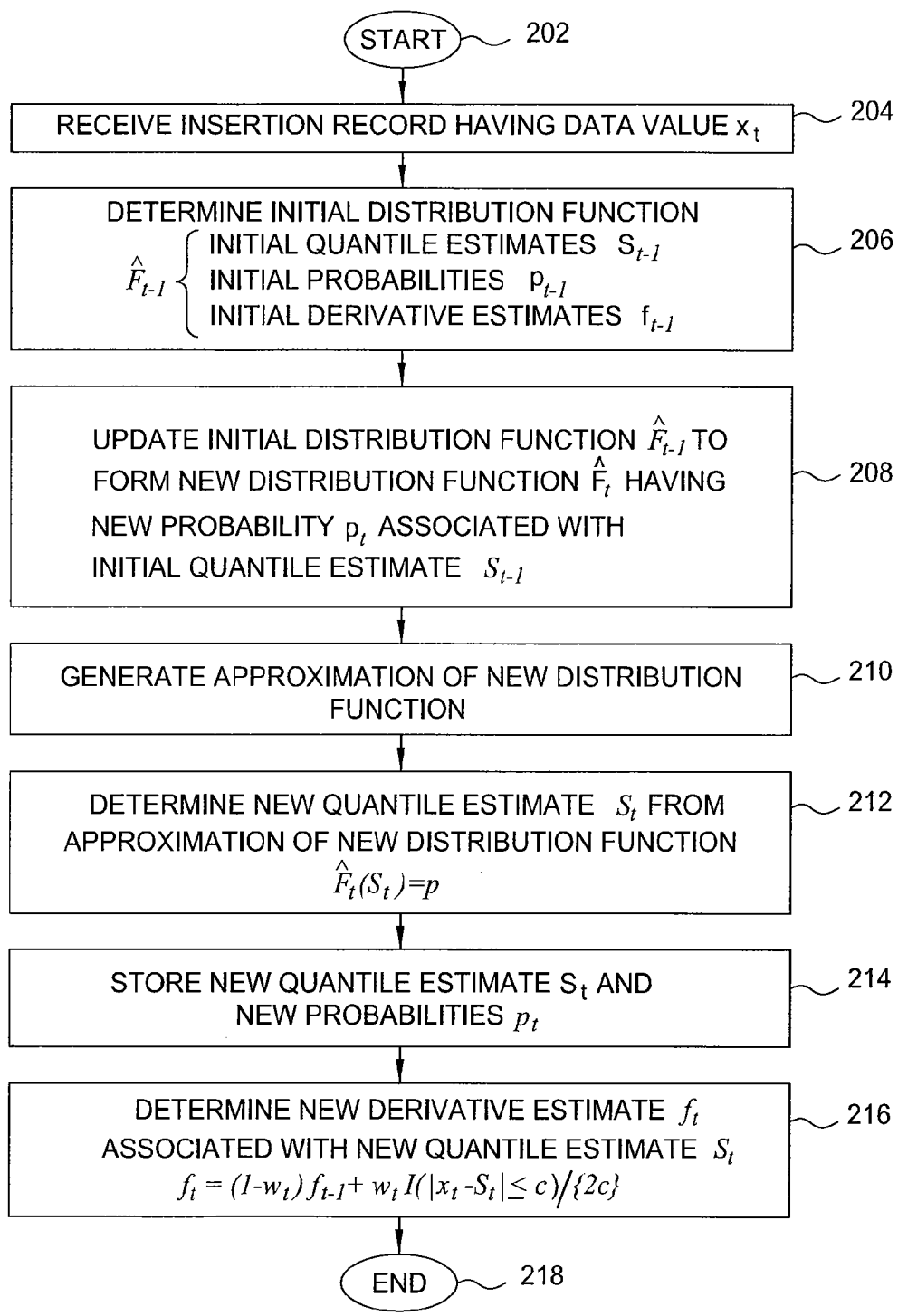
FIG. 2 depicts one embodiment of a method for incrementally tracking estimated quantiles of a data distribution using single-quantile SA-based incremental quantile estimation.
Figure 3:
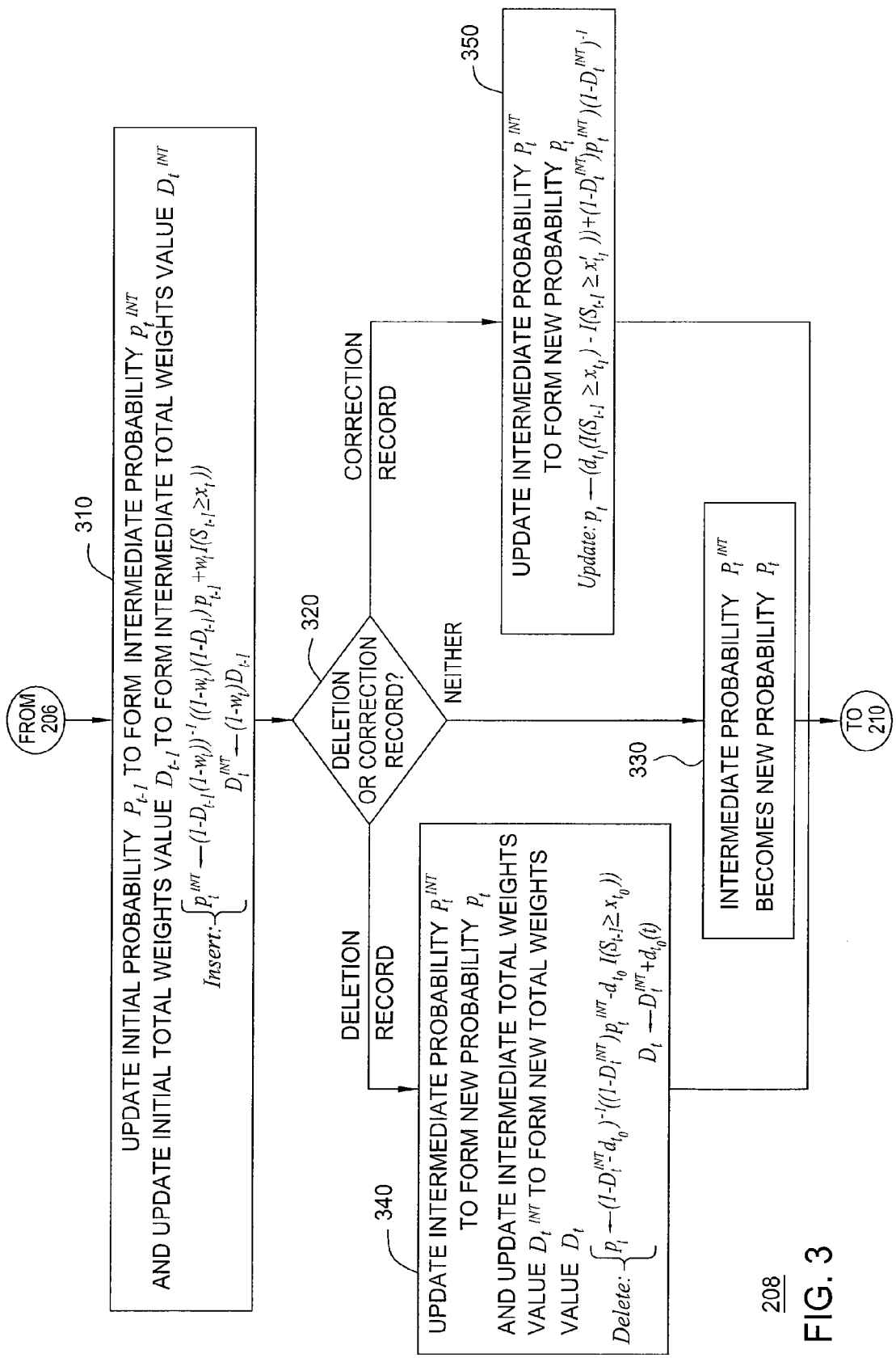
FIG. 3 depicts one embodiment of a method for updating an initial distribution function to form a new distribution function for use with the single-quantile SA-based incremental quantile estimation method of FIG. 2.

A method, according to one embodiment, for tracking the estimated quantiles of distribution function F(x) using an incremental approximation to distribution function F(x) upon new data arrivals is depicted and described with respect to FIG. 2-FIG. 3. It will be appreciated that this exemplary embodiment is depicted and described for the case of incremental quantile tracking that is performed using single-quantile SA-based incremental quantile estimation.

FIG. 2 depicts one embodiment of a method for incrementally tracking estimated quantiles of a data distribution using single-quantile SA-based incremental quantile estimation. The method 200 is performed for incrementally updating the estimated quantiles of a data distribution at a current time t at which an insertion record is received and, optionally, one or both of an update record and a correction record are received. Although depicted and described as being performed serially, at least a portion of the steps of method 200 may be performed contemporaneously, or in a different order than depicted and described with respect to FIG. 2.

At step 202, the method 200 begins.

At step 204, an insertion record is received. The insertion record includes a new data value $x_t$. The new data value $x_t$ may be any suitable value and may be received in any suitable manner, which may depend, at least in part, on the application for which incremental tracking of estimated quantiles is performed (e.g., receiving a data insertion record for a database, receiving a data value in a data stream in a network, and the like).

At step 206, an initial distribution function (denoted as $\hat{F}_{t-1}$) is determined.

The initial distribution function $\hat{F}_{t-1}$ has properties similar to distribution function F(x) depicted and described with respect to FIG. 1. The initial distribution function $\hat{F}_{t-1}$ includes an initial quantile estimate $S_{t-1}$ and an initial probability $p_{t-1}$ associated with the initial quantile estimate $S_{t-1}$.

The initial distribution function $\hat{F}_{t-1}$ also includes an initial derivative estimate $f_{t-1}$ associated with the initial quantile estimate $S_{t-1}$.

In one embodiment, the initial distribution function $\hat{F}_{t-1}$ may be a distribution function initialized in a certain manner (e.g., the distribution function $\hat{F}_0$ at time $t=0$, where this is the first time method 200 is being executed for the given set of received data values).

In one embodiment, the initial distribution function $\hat{F}_{t-1}$ may be the distribution function determined during a previous time (t−1) at which the previous data record was received (e.g., the initial distribution function $\hat{F}_{t-1}$ may be the approximation of the new distribution function determined during the previous execution of method 200 at previous time (t−1), where method 200 has already been executed for one or more previously received data records).

At step 208, the initial distribution function $\hat{F}_{t-1}$ is updated to form a new distribution function (denoted as $\hat{F}_t$) based on the new data value $x_t$ and, optionally, based on a deletion record and/or a correction record. The new distribution function $\hat{F}_t$ includes a new probability $p_t$ that is associated with the initial quantile estimate $S_{t-1}$ of the initial distribution function $\hat{F}_{t-1}$. In one embodiment, the initial distribution function $\hat{F}_{t-1}$ is updated to form the new distribution function $\hat{F}_t$ using method 300 depicted and described with respect to FIG. 3.

FIG. 3 depicts one embodiment of a method for updating an initial distribution function to form a new distribution function for use with the single-quantile SA-based incremental quantile estimation method of FIG. 2. As noted above, the exemplary method depicted and described with respect to FIG. 3 is suitable for use as step 208 of FIG. 2. Although depicted and described as being performed serially, at least a portion of the steps of method 208 may be performed contemporaneously, or in a different order than depicted and described with respect to FIG. 3.

As depicted in FIG. 3, method 208 is entered from step 206 of method 200 (at which point the initial distribution function is determined) and exits to step 210 of method 200 (at which point an approximation of the determined new distribution function is generated). A description of method 208 follows.

At step 310, the initial probability $p_{t-1}$ associated with the initial quantile estimate $S_{t-1}$ of initial distribution function $\hat{F}_{t-1}$ is updated to form intermediate probability $p_t^{INT}$ and the initial total weights value $D_{t-1}$ is updated to form an intermediate total weights value $D_t^{INT}$. The intermediate probability $p_t^{INT}$ and intermediate total weights value $D_t^{INT}$ are determined, based on the data value $x_t$ of the insertion record, as follows:

Insert:
$$\begin{cases} p_t^{INT} \leftarrow (1 - D_{t-1}(1-w_t))^{-1}((1-w_t)(1-D_{t-1})p_{t-1} + w_t I(S_{t-1} \geq x_t)) \\ D_t^{INT} \leftarrow (1-w_t)D_{t-1} \end{cases}$$

At step 320, a determination is made as to whether a deletion record or a correction record has been received along with the insertion record. If neither a deletion record nor a correction record has been received (i.e., only an insertion record was received at time t), method 208 proceeds to step 330. If a deletion record was received at time t, method 208 proceeds to step 340. If a correction record was received at time t, method 208 proceeds to step 350.

At step 330, since only an insertion record was received at time t: (a) the intermediate probability $p_t^{INT}$ determined in step 310 becomes the new probability $p_t$ associated with initial quantile estimate $S_{t-1}$ to form thereby new distribution function $\hat{F}_t$, and (b) the intermediate total weights value $D_t^{INT}$ determined in step 310 becomes the new total weights value $D_t$.

At step 340, since a deletion record was received in addition to the insertion record: (a) the intermediate probability $p_t^{INT}$ determined in step 310 is updated again to become the new probability $p_t$ associated with initial quantile estimate $S_{t-1}$ to form thereby new distribution function $\hat{F}_t$, and (b) the intermediate total weights value $D_t^{INT}$ determined in step 310 is updated again to become the new total weights value $D_t$. The new probability $p_t$ and new total weights value $D_t$ are determined, based on the deletion record, as follows:

Delete:
$$\begin{cases} p_t \leftarrow (1 - D_t^{INT} - d_{t_0})^{-1}((1 - D_t^{INT})p_t^{INT} - d_{t_0} I(S_{t-1} \geq x_{t_0})) \\ D_t \leftarrow D_t^{INT} + d_{t_0}(t), \end{cases}$$

where $d_{t_0}(t)$ is $d_{t_0}(t) = w_{t_0} \Pi_{s=t_0+1}^{t}(1-w_s)$.

At step 350, since a correction record was received in addition to the insertion record, the intermediate probability $p_t^{INT}$ determined in step 310 is updated again to become the new probability $p_t$ associated with initial quantile estimate $S_{t-1}$ to form thereby new distribution function $\hat{F}_t$. As described hereinabove, the intermediate probability $p_t^{INT}$ is determined, based on the correction record, as follows:

Correction: $p_t \leftarrow (d_{t_1}(I(S_{t-1} \geq x_{t_1}) - I(S_{t-1} \geq x'_{t_1})) + (1 - D_t^{INT})p_t^{INT})(1-D_t^{INT})^{-1}$.

As depicted in FIG. 3, the result of each of the steps 330, 340, and 350 is the new probability $p_t$ associated with initial quantile estimate $S_{t-1}$. The combination of the initial quantile estimate $S_{t-1}$ and the associated new probability $p_t$ provides the new distribution function $\hat{F}_t$. From steps 330, 340, and 350, method 208 ends (i.e., method 208 exits to step 210 of method 200, at which point an approximation of the new distribution function is generated).

Returning now to FIG. 2, the new distribution function $\hat{F}_t$ is further updated to form an approximation of the new distribution function.

At step 210, an approximation of the new distribution function is generated. In one embodiment, the approximation of the new distribution function is generated by constructing a local linear approximation of the new distribution function $\hat{F}_t$ at quantile point $(S_{t-1}, p_t)$ using a line with a slope of initial density estimate $f_{t-1}$. The approximation of the new distribution function may be generated in any other suitable manner.

At step 212, a new quantile estimate $S_t$ is determined from the approximation of the new distribution function. The new quantile estimate $S_t$ is determined from the approximation of the new distribution function as follows: $\hat{F}_t(S_t) = p$.

At step 214, the new quantile estimate $S_t$ and the new probability $p_t$ of the approximation of the new distribution function are stored. The new quantile estimate $S_t$ and the new probability $p_t$ may be stored in any suitable manner.

In one embodiment, for example, the new quantile estimate $S_t$ and the new probability $p_t$ may be stored as a set of data values.

In one embodiment, for example, the new quantile estimate $S_t$ and the new probability $p_t$ may be stored by storing the approximation of the new distribution function.

The storage of new quantile estimate $S_t$ and new probability $p_t$ of the new distribution function enables queries for quantile estimate $S_t$ to be answered. A method according to one embodiment for responding to queries of quantile estimates using the approximation of the new distribution function is depicted and described with respect to FIG. 8.

At step 216, new derivative estimate $f_t$ associated with new quantile estimate $S_t$ is determined. In one embodiment, new derivative estimate $f_t$ may be determined as follows: $f_t = (1-w_t)f_{t-1} + w_t I(|x_t - S_t| \le c)/\{2c\}$, where c is a tunable parameter representing the window size around the new quantile estimate $S_t$ for which the respective new derivative estimate $f_t$ is determined. The window size c may be set to any suitable values. It will be appreciated that, since the new derivative estimate $f_t$ is not required for use in responding to queries for quantile estimate $S_t$, determining the new derivative estimate may be viewed as an extraneous step required for purposes of performing method 200. In one embodiment, as depicted in FIG. 2, this step may be considered as a post-processing step (e.g., performed after the approximation of the new distribution function is determined in order to obtain the derivative estimate associated with current time t which is to be used as the initial derivative estimate the next time method 200 is executed). In one embodiment, not depicted in FIG. 2, this step may be considered as a pre-processing step (e.g., performed before the initial distribution function is determined in order to obtain the derivative estimate associated with current time t which is to be used as the initial derivative estimate the next time method 200 is executed).

At step 218, method 200 ends.

Although depicted and described as ending, it will be appreciated that method 200 may be executed for each new insertion record that is received for purposes of incrementally updating quantile estimates.

The single-quantile SA-based incremental quantile estimation capability depicted and described herein may utilize multiple types of weights $w_t$ in updating the initial distribution function to form the new distribution function. For example, the weights $w_t$ may be diminishing (e.g., $w_t = 1/t$) or constant ($w_t = w$), or set in any other suitable manner.

First, consider the case of diminishing weights $w_t = 1/t$. For deletion, it may be shown, by induction, that total weights value $D_t$ is the proportion of deletes in the data. For example, suppose that total weights value $D_t$ is the proportion of deletes in the data at time t−1, and, further, that there are k deletes up to time t−1. With the arrival of $x_t$ at time t the total weights value $D_t$ is given by $D_t = D_{t-1}(1-1/t) = k/(t-1)(t-1)/t = k/t$, which is actually the ratio of deletes in the data up to time t. If there is deletion, at time t, of an earlier data record, then it may be seen from $d_{t_0}(t) = w_{t_0} \Pi_{s=t_0+1}^{t}(1-w_s)$ that $d_{t_0}(t) = 1/t$. Thus, $D_t = (k+1)/t$, which, again, is the proportion of deletes. For correction, there is no change in total weights value $d_t$, so total weights value $D_t$ remains to be the proportion of deletes. In this case, for the insertion of data value $x_t$, it may be seen that the approximation of the new distribution function $\hat{F}_t(x)$ is the weighted sum of $\hat{F}_{t-1}(x)$ and $I(x \ge x_t)$ with weights $(1-(t-k)^{-1})$ and $(t-k)^{-1}$, respectively. Thus, the actual weight given to insertion data value is in fact $1/(t-k)$, not the initial weight $1/t$. This change is due to the deletion of k points.

Second, consider the case of constant weights $w_t = w$. In this case, let $w_t = w$ for a positive w, and let $s_1 < s_2 < \ldots < s_k$ be the index of the data that are deleted until time t, where k is the total number of deletes before time t. With the arrival of data value $x_t$, it may be shown that the total weights value $D_t$ is given by $D_t = (1-w)_{t-s_1}^{-1}w + (1-w)_{t-s_2}^{-1}w + \ldots + (1-w)_{t-s_k}^{-1}w$. This is primarily because the total weights value $D_t$ is the sum of the weights of the deleted data. From $d_{t_0}(t) = W_{t_0}\Pi_{s=t_0+1}^{t}(1-w_s)$, it may be seen that $d_{t_0}(t) = w(1-w)_{t-t_0}^{+1}$, and, further, from the update of total weights value $D_t$ in response to an insertion data record it may be seen that every insertion will reduce total weights value $D_t$ by a factor of $(1-w)$.

It will be appreciated that the weights $w_t$ used in updating the initial distribution function to form the new distribution function, as depicted and described with respect to FIG. 2 and FIG. 3, may be set in any other suitable manner.

As indicated herein, the SA-based incremental quantile estimation capability for multiple record types may be provided as a single-quantile SA-based incremental quantile estimation capability (in which a single quantile estimate is updated upon receiving each insertion record) or as a multiple-quantile SA-based incremental quantile estimation capability (in which more than one quantile estimate is updated upon receiving each insertion record). The description provided hereinabove is primarily directed toward the single-quantile SA-based incremental quantile estimation capability. A description of the multiple-quantile SA-based incremental quantile estimation capability follows.

The multiple-quantile SA-based incremental quantile estimation capability may be better understood by first considering the single-quantile SA-based incremental quantile estimation capability, and then determining the manner in which the single-quantile SA-based incremental quantile estimation capability may be modified in order to provide the multiple-quantile SA-based incremental quantile estimation capability. In general, in order to implement the multiple-quantile SA-based incremental quantile estimation capability, rather than performing many of the steps of method 200 for a single quantile estimate each time an insertion record is received, many of the steps of method 200 are performed for multiple quantile estimates each time an insertion record is received. As will be seen from the description below, this difference also results in other differences between the single-quantile SA-based incremental quantile estimation capability and the multiple-quantile SA-based incremental quantile estimation capability.

A general description of an embodiment of the multiple-quantile SA-based incremental quantile estimation capability follows.

In this embodiment, as in the above description, assume that the set of data records for which incremental quantile approximation is performed includes insertion records, deletion records, and correction records.

In this embodiment, assume that at time t there is always a data value $x_t$ inserted, but at the same time there also could be one or both of: (1) a data value $x_{t_0}$ from a previous time $t_0$ that will be deleted (i.e., the data value is no longer to be considered), and (2) a data value $x_{t_1}$ from a previous time $t_1$ that will be updated with a new data value $x'_{t_1}$ (i.e., the data sample at time $t_1$ should be replaced by data value $x'_{t_1}$).

In this embodiment, let $w_t$ be a sequence of intended or initial weights for the insertion data value $x_t$ at time t. The weights for the insertion data value $x_t$ are deemed to be intended or initial, because the actual weights for the insertion data value $x_t$ will be modified due to deletion. For deletion data value $x_{t_0}$, the intended weight at time t is: $d_{t_0}(t) = w_{t_0}\Pi_{s=t_0+1}^{t}(1-w_s)$.

In this embodiment, assume that the approximation of the distribution function at time t−1 is denoted as $\hat{F}_{t-1}$. Additionally, define an initial total weights value $D_0 = 0$. The approximation of the distribution function at time t−1 is the initial distribution function $\hat{F}_{t-1}$ at time t (similar to step 206 described with respect to FIG. 2 for the single-quantile SA-based incremental quantile estimation capability). The initial distribution function $\hat{F}_{t-1}$ is updated to form the new distribution function $\hat{F}_t$ by updating initial probabilities $p_{t-1}(i)$ to form new probabilities $p_t(i)$ (similar to step 208 described with respect to FIG. 2 for the single-quantile SA-based incremental quantile estimation capability). Additionally, the initial total weights value $D_{t-1}$ is updated to form new total weights value $D_t$.

At time t, with the insertion record including insertion data value $x_t$, updating of the initial distribution function $\hat{F}_{t-1}$ and the initial total weights value $D_{t-1}$ may be represented as follows:

$$\text{Insert:} \begin{cases} \hat{F}_t(x) \leftarrow \dfrac{(1-w_t)(1-D_{t-1})\hat{F}_{t-1}(x) + w_t I(x \geq x_t)}{1 - D_{t-1}(1-w_t)} \\ D_t \leftarrow (1-w_t)D_{t-1} \end{cases}$$

If there are no deletion or correction records at time t, the updating of the initial distribution function $\hat{F}_{t-1}$ is complete (because no further update of the initial distribution function $\hat{F}_{t-1}$ is required at time t).

If there is a deletion record or a correction record at time t, the updated distribution function $\hat{F}_t$ that is generated based on the insertion record is further updated to account for the deletion or correction.

At time t, if there is a deletion record indicating deletion of data value $x_{t_0}$, then: (a) the updated distribution function $\hat{F}_t$ that is generated based on the insertion data value from the insertion record is further updated based on the deletion record in order to represent the new distribution function $\hat{F}_t$, and (b) the updated total weights value $D_t$ that is generated based on the weight of the insertion data value from the insertion record is further updated based on the deletion record in order to represent the new total weights value $D_t$. The further updating of the updated distribution function $\hat{F}_t$ and the updated total weights value $D_t$ based on the deletion record may be represented as follows:

$$\text{Delete:} \begin{cases} \hat{F}_t(x) \leftarrow \dfrac{(1-D_t)F_t(x)d_{t_0}I(x \geq x_{t_0})}{1 - D_t - d_{t_0}} \\ D_t \leftarrow D_t + d_{t_0}(t) \end{cases}$$

where $d_{t_0}(t)$ is determined as $d_{t_0}(t) = w_{t_0}\Pi_{s=t_0+1}^{t}(1-w_s)$. It will be appreciated that these deletion equations remove the influence of data value $x_{t_0}$ at time t since the weight for $x_{t_0}$ now reduces to $d_{t_0}(t)$.

At time t, if there is a correction record indicating correction of data value $x_{t_1}$ at time t with a new value $x'_{t_1}$, then: (a) the updated distribution function $\hat{F}_t$ that is generated based on the insertion data value from the insertion record is further updated based on the correction record in order to represent the new distribution function $\hat{F}_t$, and (b) the updated total weights value $D_t$ that is generated based on the weight of the insertion data value from the insertion record remains unchanged. The further updating of the updated distribution function $\hat{F}_t$ based on the correction record may be represented as follows:

$$\text{Correction:} \begin{cases} \hat{F}_t(x) \leftarrow \dfrac{(1-D_t)F_t(x) + d_{t_1}\left(I(x \geq x_{t_1}) - I(x \geq x'_{t_1})\right)}{1-D_t} \\ D_t \quad \text{remains unchanged} \end{cases}$$

In the above-defined equations for insertion, deletion, and correction records, the total weights value $D_t$ represents the total of all weights from data values deleted at time t. As such, the total weights of data that contributed to updated distribution function $\hat{F}_t$ at time t is not one, but, rather, is $1-D_t$ due to deletions.

For the insertion equations, with the arrival of new data value $x_t$, the updated distribution function $\hat{F}_t$ is the weighted sum $I(x \geq x_{t-1})$ from insertion data value $x_t$ with weight $w_t$, and initial distribution function $\hat{F}_{t-1}$ with weight $(1-w_1)(1-D_{t-1})$, normalized to have a total weight of one. Additionally, the weight of the deleted data in $\hat{F}_t$ is updated by a factor of $(1-w_t)$.

As described hereinabove, from the above-described equations, the equations adapted for use in updating the initial probabilities $p_{t-1}(i)$ to form the new probabilities $p_t(i)$ may be derived. Namely, the equations adapted for use in updating the initial probabilities $p_{t-1}(i)$ to form the new probabilities $p_t(i)$ may be derived by evaluating the new distribution function $\hat{F}_t$ at each of the initial quantile estimates $S_{t-1}(i)$ at time $t-1$.

The initial probabilities $p_{t-1}(i)$ are updated to form the new probabilities $p_t(i)$ as follows (where an assumption is made that initial total weights value $D_0=0$).

At time t, with the insertion record including insertion data value $x_t$: (a) the initial probabilities $p_{t-1}(i)$ are updated to form intermediate probabilities $p_t^{INT}(i)$, and (b) and the initial total weights value $D_{t-1}$ is updated to form an intermediate total weights value $D_t^{INT}$, as follows:

$$\text{Insert:} \begin{cases} p_t^{INT}(i) \leftarrow (1 - D_{t-1}(1-w_t))^{-1}\begin{pmatrix}(1-w_t)(1-D_{t-1})p_{t-1}(i) + \\ w_t I(S_{t-1}(i) \geq x_t)\end{pmatrix} \\ D_t^{INT} \leftarrow (1-w_t)D_{t-1} \end{cases}$$

If there are no deletion or correction records at time t, the intermediate probabilities $p_t^{INT}(i)$ are denoted as new probabilities $p_t(i)$ (because no further update of the probabilities is required at time t).

If there is a deletion record or a correction record at time t, the intermediate probabilities $p_t^{INT}(i)$ are further updated, based on the deletion or correction, in order to determine new probabilities $p_t(i)$.

At time t, if there is a deletion record indicating deletion of data value $x_{t_0}$, then: (a) the intermediate probabilities $p_t^{INT}(i)$ determined based on the insertion record are further updated based on the deletion record in order to determine new probabilities $p_t(i)$, and (b) the intermediate total weights value $D_t^{INT}$ that is generated based on the weight of the insertion data value from the insertion record is further updated based on the deletion record in order to determine the new total weights value $D_t$. The further updating of the intermediate probabilities $p_t^{INT}(i)$ and the intermediate total weights value $D_t^{INT}$ based on the deletion record is performed as follows:

$$\text{Delete:} \begin{cases} p_t(i) \leftarrow (1 - D_t^{INT} - d_{t_0})^{-1}((1 - D_t^{INT})p_t^{INT}(i) - d_{t_0}I(S_{t-1}(i) \geq x_{t_0})) \\ D_t \leftarrow D_t^{INT} + d_{t_0}(t) \end{cases}$$

where $d_{t_0}(t)$ is $d_{t_0}(t) = w_{t_0}\Pi_{s=t_0+1}^{t}(1-w_s)$.

At time t, if there is a correction record indicating correction of data value $x_{t_1}$ at time t with a new value $x_{t_1}$, then: (a) the intermediate probabilities $p_t^{INT}(i)$ determined based on the insertion record are further updated based on the correction record in order to determine new probabilities $p_t(i)$, and (b) the updated total weights value $D_t$ that is generated based on the weight of the insertion data value from the insertion record remains unchanged. The further updating of the intermediate probabilities $p_t^{INT}(i)$ based on the correction record is performed as follows:

$$\text{Correction: } p_t(i) \leftarrow (d_{t_1}(I(S_{t-1}(i) \geq x_{t_1}) - I(S_{t-1}(i) \geq x'_{t_1})) + (1-D_t^{INT}) p_t^{INT}(i))(1-D_t^{INT})^{-1}.$$

A method, according to one embodiment, for tracking the estimated quantiles of distribution function $F(x)$ using an incremental approximation to distribution function $F(x)$ upon new data arrivals is depicted and described with respect to FIG. 4-FIG. 7. It will be appreciated that this exemplary embodiment is depicted and described for the case of incremental quantile tracking that is performed using multiple-quantile SA-based incremental quantile estimation.

Figure 4:
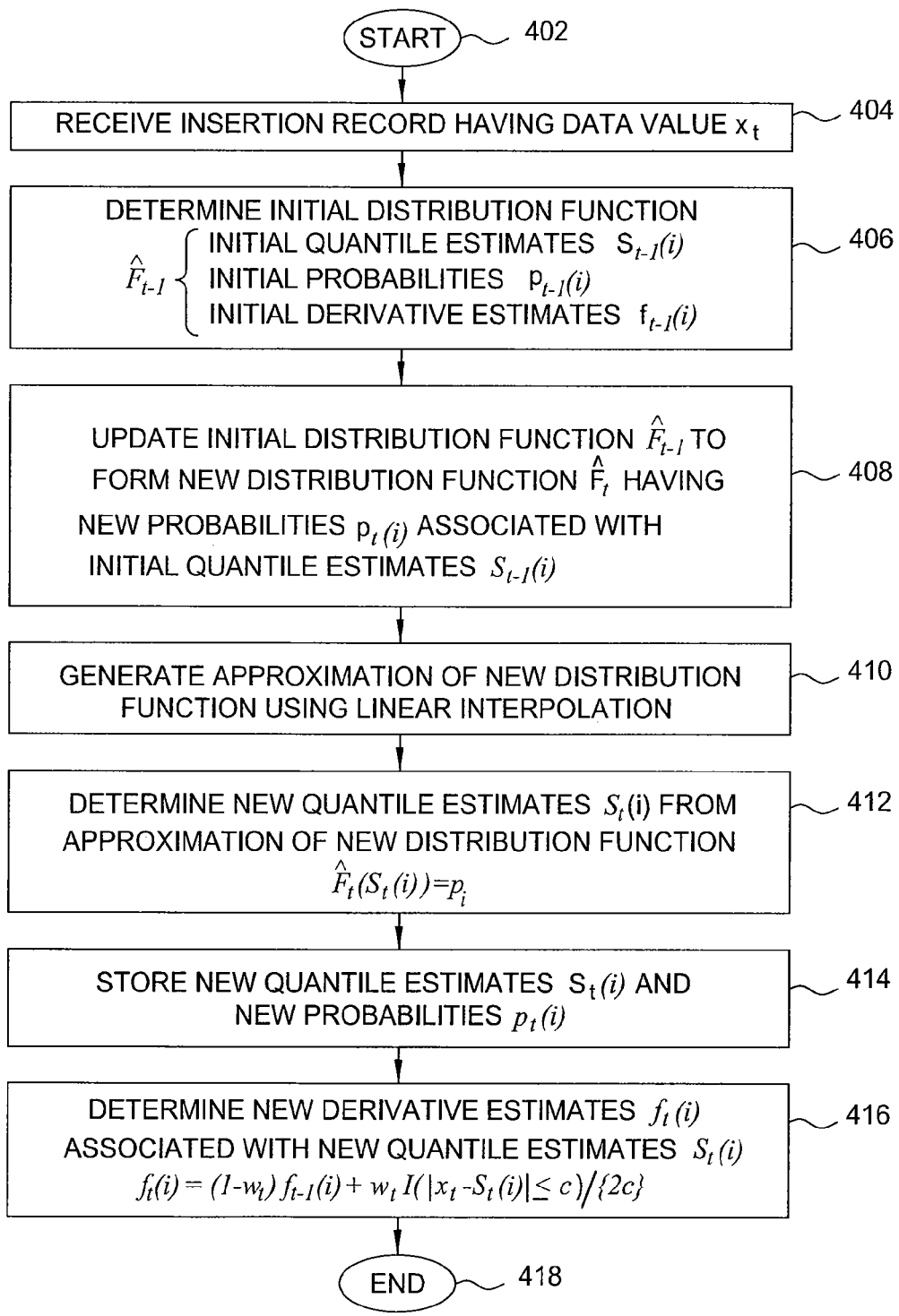
FIG. 4 depicts one embodiment of a method for incrementally tracking estimated quantiles of a data distribution using multiple-quantile SA-based incremental quantile estimation.

FIG. 4 depicts one embodiment of a method for incrementally tracking estimated quantiles of a data distribution using multiple-quantile SA-based incremental quantile estimation. The method 400 is performed for incrementally updating the estimated quantiles of a data distribution at a current time $t$ at which an insertion record is received and, optionally, one or both of an update record and a correction record are received. Although depicted and described as being performed serially, at least a portion of the steps of method 400 may be performed contemporaneously, or in a different order than depicted and described with respect to FIG. 4.

At step 402, the method 400 begins.

At step 404, an insertion record is received. The insertion record includes a new data value $x_t$. The new data value $x_t$ may be any suitable value and may be received in any suitable manner, which may depend, at least in part, on the application for which incremental tracking of estimated quantiles is performed (e.g., receiving a data insertion record for a database, receiving a data value in a data stream in a network, and the like).

At step 406, an initial distribution function (denoted as $\hat{F}_{t-1}$) is determined.

The initial distribution function $\hat{F}_{t-1}$ has properties similar to the distribution function $F(x)$ depicted and described with respect to FIG. 1. The initial distribution function $\hat{F}_{t-1}$ includes a plurality of initial quantile estimates ($S_{t-1}(i)$, $1 \leq i \leq K$) and a plurality of initial probabilities ($p_{t-1}(i)$, $1 \leq i \leq K$) associated with the respective initial quantile estimates $S_{t-1}(i)$. The initial distribution function $\hat{F}_{t-1}$ also includes a plurality of initial derivative estimates ($f_{t-1}(i)$, $1 \leq i \leq K$) associated with the respective initial quantile estimates $S_{t-1}(i)$.

In one embodiment, the initial distribution function $\hat{F}_{t-1}$ may be a distribution function initialized in a certain manner (e.g., the distribution function $\hat{F}_0$ at time $t=0$, where this is the first time method 400 is being executed for the given set of received data values).

In one embodiment, the initial distribution function $\hat{F}_{t-1}$ may be the distribution function determined during a previous time (t-1) at which the previous data record was received (e.g., the initial distribution function $\hat{F}_{t-1}$ may be the approximation of the new distribution function determined during the previous execution of method 400 at previous time (t-1), where method 400 has already been executed for one or more previously received data records).

At step 408, the initial distribution function $\hat{F}_{t-1}$ is updated to form a new distribution function (denoted as $\hat{F}_t$) based on the new data value $x_t$, and, optionally, based on a deletion record and/or a correction record. The new distribution function $\hat{F}_t$ includes a plurality of new probabilities ($p_t(i)$, $1 \leq i \leq K$) associated with the initial quantile estimates $S_{t-1}(i)$ of the initial distribution function $\hat{F}_{t-1}$. In one embodiment, the initial distribution function $\hat{F}_{t-1}$ is updated to form the new distribution function $\hat{F}_t$ using method 500 depicted and described with respect to FIG. 5.

Figure 5:
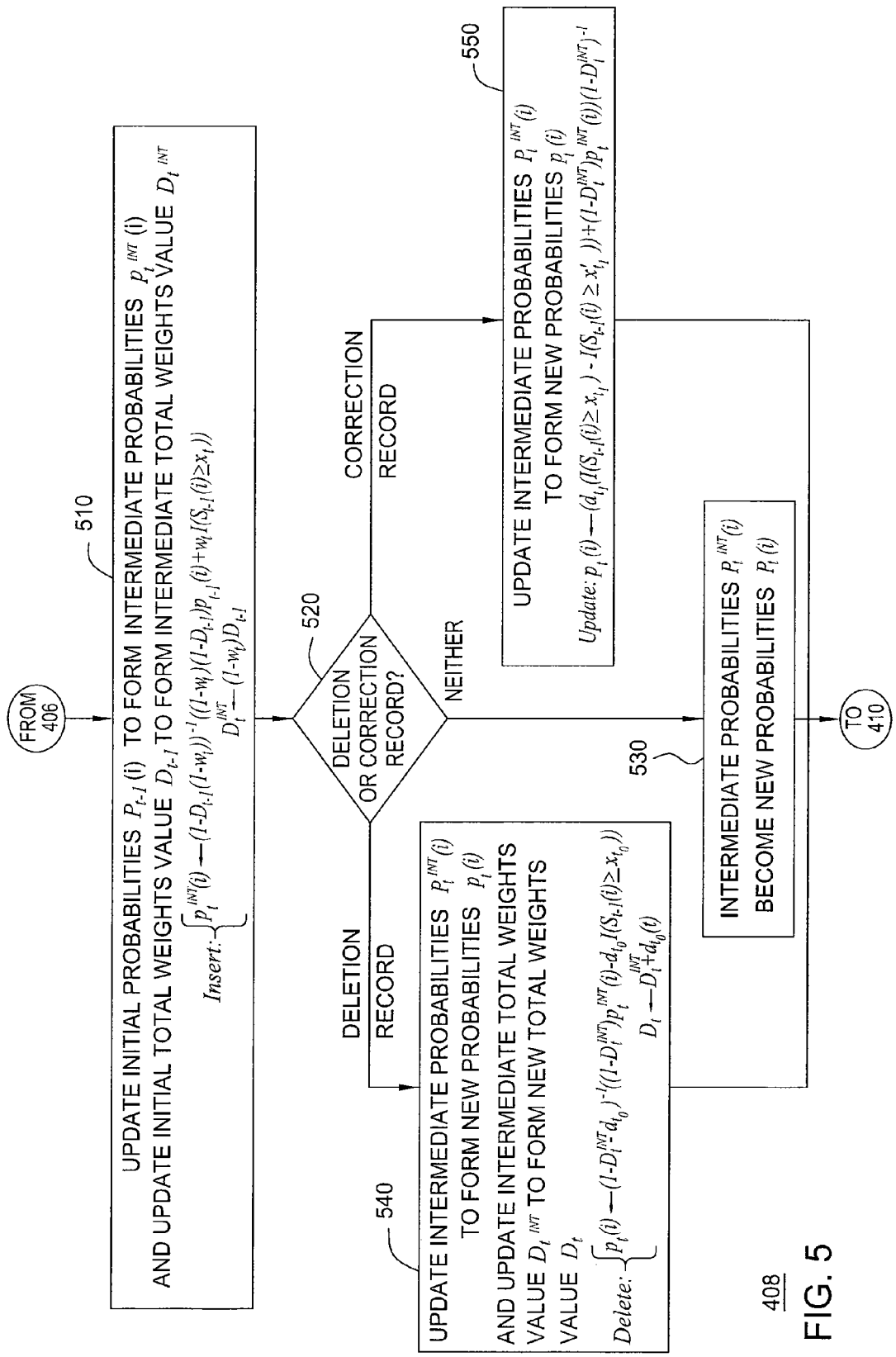
FIG. 5 depicts one embodiment of a method for updating an initial distribution function to form a new distribution function for use with the multiple-quantile SA-based incremental quantile estimation method of FIG. 4.

FIG. 5 depicts one embodiment of a method for updating an initial distribution function to form a new distribution function for use with the multiple-quantile SA-based incremental quantile estimation method of FIG. 4. As noted above, the exemplary method depicted and described with respect to FIG. 5 is suitable for use as step 408 of FIG. 4. Although depicted and described as being performed serially, at least a portion of the steps of method 408 may be performed contemporaneously, or in a different order than depicted and described with respect to FIG. 5.

As depicted in FIG. 5, method 408 is entered from step 406 of method 400 (at which point the initial distribution function is determined) and exits to step 410 of method 400 (at which point an approximation of the new distribution function is generated using linear interpolation). A description of method 408 follows.

At step 510, the initial probabilities $p_{t-1}(i)$ associated with the initial quantile estimates $S_{t-1}(i)$ of initial distribution function $\hat{F}_{t-1}$ are updated to form intermediate probabilities $p_t^{INT}(i)$ and the initial total weights value $D_{t-1}$ is updated to form an intermediate total weights value $D_t^{INT}$. The intermediate probabilities $p_t^{INT}(i)$ and intermediate total weights value $D_t^{INT}$ are determined as follows:

$$\text{Insert: } \begin{cases} p_t^{INT}(i) \leftarrow (1 - D_{t-1}(1-w_t))^{-1} \begin{pmatrix} (1-w_t)(1-D_{t-1})p_{t-1}(i) + \\ w_t I(S_{t-1}(i) \geq x_t) \end{pmatrix} \\ D_t^{INT} \leftarrow (1-w_t)D_{t-1} \end{cases}$$

At step 520, a determination is made as to whether a deletion record or a correction record has been received along with the insertion record. If neither a deletion record nor a correction record has been received (i.e., only an insertion record was received at time t), method 408 proceeds to step 530. If a deletion record was received at time t, method 408 proceeds to step 540. If a correction record was received at time t, method 408 proceeds to step 550.

At step 530, since only an insertion record was received at time t: (a) the intermediate probabilities $p_t^{INT}(i)$ determined in step 510 become the new probabilities $p_t(i)$ associated with initial quantile estimates $S_{t-1}(i)$ to form thereby new distribution function $\hat{F}_t$, and (b) the intermediate total weights value $D_t^{INT}$ determined in step 510 becomes the new total weights value $D_t$.

At step 540, since a deletion record was received in addition to the insertion record: (a) the intermediate probabilities $p_t^{INT}(i)$ determined in step 510 are updated again to become the new probabilities $p_t(i)$ associated with initial quantile estimates $S_{t-1}(i)$ to form thereby new distribution function $\hat{F}_t$, and (b) the intermediate total weights value $D_t^{INT}$ determined in step 510 is updated again to become the new total weights value $D_t$. The new probabilities $p_t(i)$ and new total weights value $D_t$ are determined as follows:

$$\text{Delete: } \begin{cases} p_t(i) \leftarrow (1 - D_t^{INT} - d_{t_0})^{-1}((1-D_t^{INT})p_t^{INT}(i) - d_{t_0} I(S_{t-1}(i) \geq x_{t_0})) \\ D_t \leftarrow D_t^{INT} + d_{t_0}(t), \end{cases}$$

where $d_{t_0}(t)$ is $d_{t_0}(t) = w_{t_0} \Pi_{s=t_0+1}^{t}(1-w_s)$.

At step 550, since a correction record was received in addition to the insertion record, the intermediate probabilities $p_t^{INT}(i)$ determined in step 510 are updated again to become the new probabilities $p_t(i)$ associated with initial quantile estimates $S_{t-1}(i)$ to form thereby new distribution function $\hat{F}_t$. The new probabilities $p_t(i)$ are determined, as follows:

Correction: $p_t(i) \leftarrow (d_{t_1}(I(S_{t-1}(i) \geq x_{t_1}) - I(S_{t-1}(i) \geq x'_{t_1})) + (1-D_t^{INT})p_t^{INT}(i))(1-D_t^{INT})^{-1}$.

As depicted in FIG. 5, the result of each of the steps 530, 540, and 550 is the new probabilities $p_t(i)$ associated with initial quantile estimates $S_{t-1}(i)$. The combination of the initial quantile estimates $S_{t-1}(i)$ and the associated new probabilities $p_t(i)$ provides the new distribution function $\hat{F}_t$. From steps 530, 540, and 550, method 408 ends (i.e., method 408 exits to step 410 of method 400, at which point an approximation of the new distribution function $\hat{F}_t$ is generated using linear interpolation).

Returning now to FIG. 4, the new distribution function $\hat{F}_t$ is further updated to from an approximation of the new distribution function.

At step 410, an approximation of the new distribution function is generated.

In one embodiment, linear interpolation is used to generate the approximation of the new distribution function such that, in the neighborhood of each of the initial quantile estimates $S_{t-1}(i)$, the approximation of the new distribution function is a linear function with a slope specified by the respective initial derivative estimates $f_{t-1}(i)$ associated with the initial quantile estimate $S_{t-1}(i)$, and the linear points around the initial quantile estimates $S_{t-1}(i)$ are extended under the constraints of monotonicity of the interpolation function.

In one embodiment, generating the approximation of the new distribution function includes, for each pair of adjacent quantile points in the new distribution function $\hat{F}_t$ (where each pair of adjacent quantile points includes a first quantile point $(S_{t-1}(i), p_t(i))$ and a second quantile point $(S_{t-1}(i+1), p_t(i+1))$ performing the following: (1) defining a right quantile point to the right of the first quantile point and a left quantile point to the left of the second quantile point; and (2) generating the approximation of the new distribution function for the region between the adjacent quantile points by connecting the first quantile point, the right quantile point, the left quantile point, and the second quantile point in a piecewise linear fashion. In one such embodiment, determination of the right quantile points and the left quantile points is performed using the initial quantile estimates $S_{t-1}(i)$, the initial derivative estimates $f_{t-1}(i)$, the new probabilities $p_t(i)$, and monotonicity values $\Delta_t(i)$. A more detailed description of one such embodiment is depicted and described with respect to FIG. 6.

Figure 6:
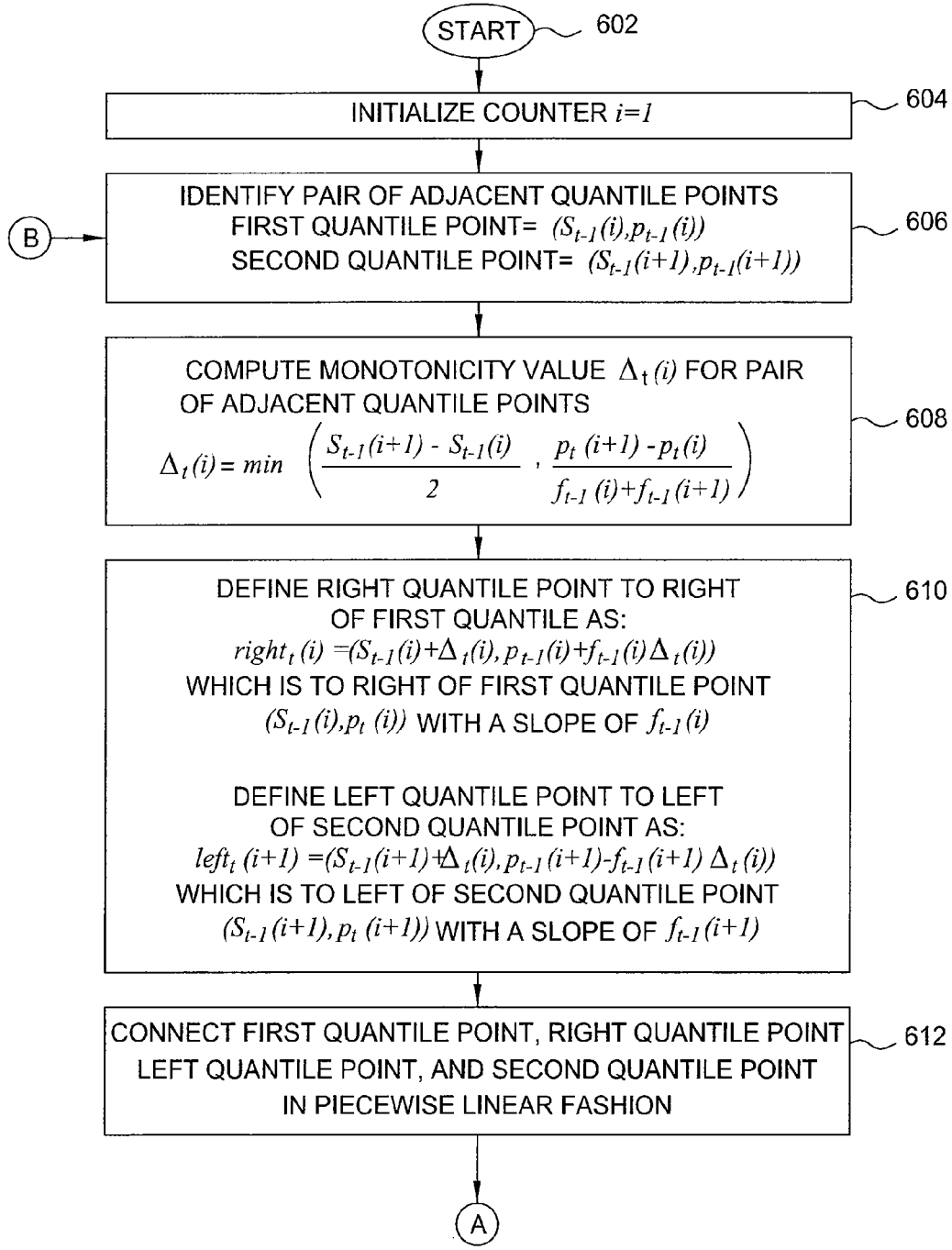
FIG. 6 depicts one embodiment of a method for generating an approximation of a distribution function for use with the method depicted and described with respect to FIG. 4.
Figure 6:
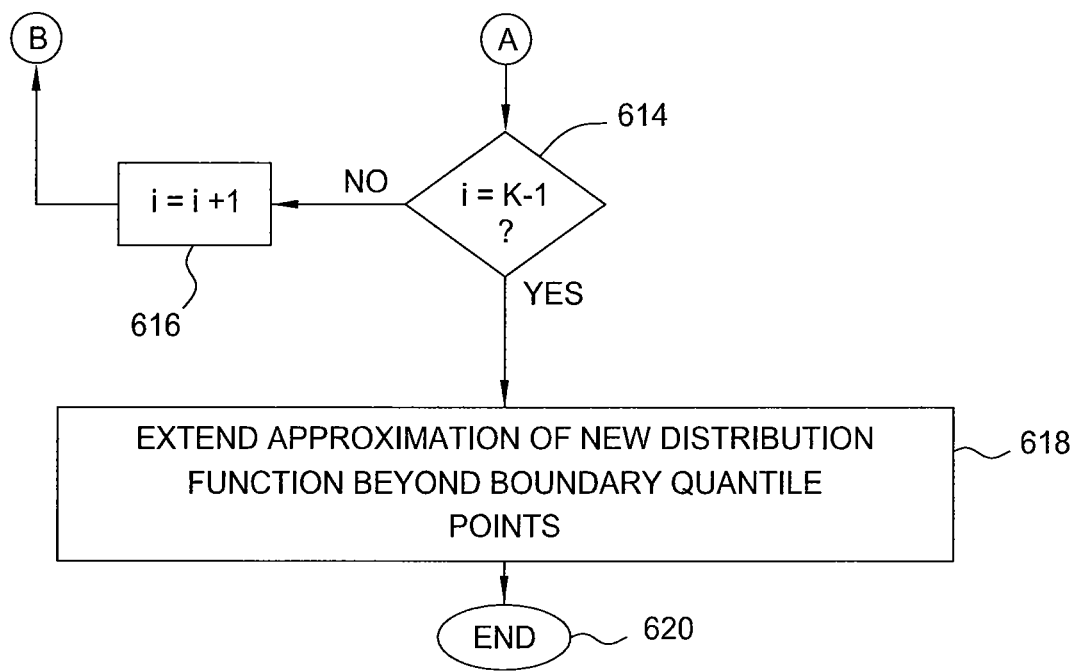

FIG. 6 depicts one embodiment of a method for generating an approximation of a distribution function for use with the method depicted and described with respect to FIG. 4. As indicated above with respect to FIG. 4, in one embodiment method 600 of FIG. 6 may be used as step 410 of method 400 of FIG. 4. Although primarily depicted and described as being performed serially, at least a portion of the steps of method 600 may be performed contemporaneously, or in a different order than depicted and described with respect to FIG. 6.

At step 602, method 600 begins.

At step 604, a counter associated with the quantile points is initialized to one (i=1, 1≤i≤K, where K is the number of estimated quantiles of the new distribution function).

At step 606, a pair of adjacent quantile points is determined. The pair of adjacent quantile points is determined based on the current value of the counter i. The pair of adjacent quantile points includes a first quantile point $(S_{t-1}(i), p_t(i))$ and a second quantile point $(S_{t-1}(i+1), p_t(i+1))$.

At step 608, a monotonicity value (denoted as $\Delta_t(i)$) is computed for the pair of adjacent quantile points.

The monotonicity value $\Delta_t(i)$ is computed such that the right quantile point and the left quantile point are non-decreasing, i.e., such that:

$[S_{t-1}(i)+\Delta_t(i)] \leq [S_{t-1}(i+1)-\Delta_t(i)]$, and $[p_t(i)+f_{t-1}(i)\Delta_t(i)] \leq [p_t(i+1)-f_{t-1}(i+1)\Delta_t(i)]$, which indicate that:

$$\Delta_t(i) = \min\left(\frac{S_{t-1}(i+1) - S_{t-1}(i)}{2}, \frac{p_t(i+1) - p_t(i)}{f_{t-1}(i) + f_{t-1}(i+1)}\right).$$

The monotonicity value $\Delta_t(i)$ may be selected in any suitable manner. In one embodiment, for example, the monotonicity value $\Delta_t(i)$ is selected as the maximum possible value determined from the right-hand side of the above equation for $\Delta_t(i)$.

At step 610, the right quantile point (denoted as $right_t(i)$) and the left quantile point (denoted $left_t(i+1)$) are defined.

The right quantile point is a point to the right of the first quantile point, and is defined as follows: $right_t(i)=(S_{t-1}(i)+\Delta_t(i), p_t(i)+f_{t-1}(i)\Delta_t(i))$, which is a point in the new distribution function $\hat{F}_t$ that is to the right of the first quantile point $(S_{t-1}(i), p_t(i))$ with a slope of $f_{t-1}(i)$.

The left quantile point is a point to the left of the second quantile point, and is defined as follows: $left_t(i+1)=(S_{t-1}(i+1)-\Delta_t(i), p_t(i+1)-f_{t-1}(i+1)\Delta_t(i))$, which is a point in the new distribution function $\hat{F}_t$ that is to the left of the second quantile point $(S_{t-1}(i+1), p_t(i+1))$ with a slope of $f_{t-1}(i+1)$.

At step 612, the first quantile point, the right quantile point, the left quantile point, and the second quantile point are connected to form a portion of the approximation of the new distribution function. The first quantile point, the right quantile point, the left quantile point, and the second quantile point are connected in a piecewise linear fashion such that the first quantile point is connected to the right quantile point, the right quantile point is connected to the left quantile point, and the left quantile point is connected to the second quantile point.

At step 614, a determination is made as to whether counter i is equal to K−1. If the counter i is not equal to K−1, method 600 proceeds to step 616. If the counter i is equal to K−1, method 600 proceeds to step 618.

At step 616, the counter i is incremented by one (i=i+1), and, from step 616, method 600 returns to step 604 so that the process can be repeated for the next pair of adjacent quantile points in the new distribution function $\hat{F}_t$.

At step 618, the approximation of the new distribution function is extended beyond the two boundary quantile points until it reaches the extreme y-axis values of zero and one (i.e., the approximation of the new distribution function is extended to the left of the quantile point $(S_{t-1}(1), p_t(1))$ until it reaches the y-axis value of zero and is extended to the right of quantile point $(S_{t-1}(K), p_t(K))$ until it reaches the y-axis value of one).

At step 620, method 600 ends. Although depicted and described as ending (for purposes of clarity), in an embodiment in which method 600 is used as step 410 of method 400 of FIG. 4, processing will proceed to step 412 of method 400 of FIG. 4.

Figure 7A:
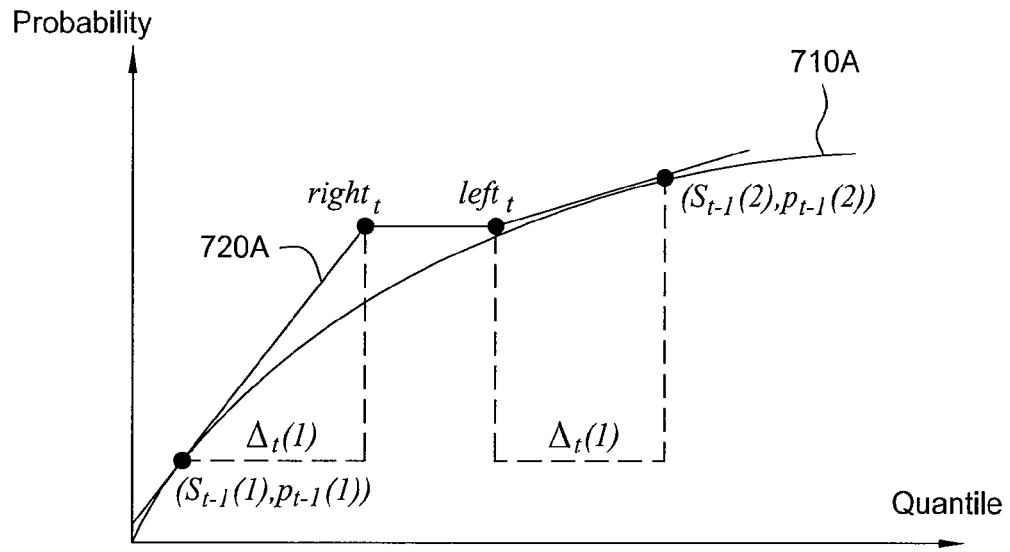
FIGS. 7A and 7B depict an approximation of a distribution function for one pair of adjacent quantile points using the method depicted and described with respect to FIG. 4.
Figure 7B:
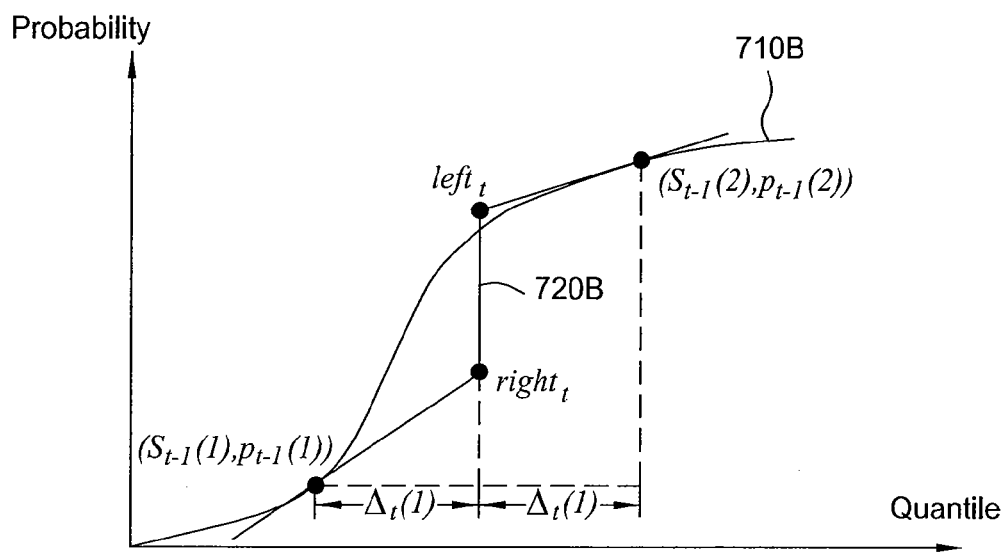

FIGS. 7A and 7B depict an approximation of a distribution function for one pair of adjacent quantile points using method 600 depicted and described with respect to FIG. 6.

As depicted in FIGS. 7A and 7B, the approximation of the new distribution function is depicted for the portion of the new distribution function that is between first quantile point $(S_{t-1}(1), p_t(1))$ and second quantile point $(S_{t-1}(2), p_t(2))$. As described hereinabove, similar approximations are performed for each of the other adjacent quantile points in the new distribution function (e.g., for second quantile point $(S_{t-1}(2), p_{t-1}(2))$ and third quantile point $(S_{t-1}(3), p_{t-1}(3))$, . . . , for last quantile point $(S_{t-1}(K-1), p_{t-1}(K-1))$ and last quantile point $(S_{t-1}(K), p_{t-1}(K))$) for purposes of generating the complete approximation of the new distribution function.

In FIGS. 7A and 7B, the depicted portion of the approximation of the new distribution function is plotted using a Cartesian coordinate system in which the x-axis indicates the values of the initial quantile estimates $S_{t-1}$ and the y-axis indicates the values of the new probabilities $p_t$ associated with the initial quantile estimates $S_{t-1}$.

The curve functions 710A and 710B represent the hypothetical smooth approximation of the data distribution of new distribution function $\hat{F}_t$ between first quantile point $(S_{t-1}(1), p_t(1))$ and second quantile point $(S_{t-1}(2), p_t(2))$.

The linear functions 720A and 720B represent the piecewise linear approximations of the new distribution function $\hat{F}_t$ between first quantile point $(S_{t-1}(1), p_t(1))$ and second quantile point $(S_{t-1}(2), p_t(2))$, determined using first and second quantile points $(S_{t-1}(1), p_t(1))$ and $(S_{t-1}(2), p_t(2))$ and the associated initial derivative estimates $f_{t-1}(1)$ and $f_{t-1}(2)$ associated with first and second quantile points $(S_{t-1}(1), p_t(1))$ and $(S_{t-1}(2), p_t(2))$, respectively.

FIGS. 7A and 7B correspond to two different cases for the monotonicity value $\Delta_t(1)$. FIG. 7A illustrates an exemplary case in which monotonicity value $\Delta_t(1)$ takes the second value in the monotonicity equation. FIG. 7B illustrates an exemplary case in which monotonicity value $\Delta_t(1)$ takes the first value in the monotonicity equation.

Returning now to FIG. 4, new quantile estimates, based upon the new data value $x_t$, are determined using the approximation of the new distribution function.

At step 412, new quantile estimates $(S_t(i))$ are determined from the approximation of the new distribution function. The new quantile estimates $(S_t(i))$ are determined from the approximation of the new distribution function as follows: $\hat{F}_t(S_t(i))=p_i$ At step 414, the new quantile estimates $S_t(i)$ and the new probabilities $p_t(i)$ of the approximation of the new distribution function are stored. The new quantile estimates $S_t(i)$ and the new probabilities $p_t(i)$ may be stored in any suitable manner.

In one embodiment, for example, the new quantile estimates $S_t(i)$ and the new probabilities $p_t(i)$ may be stored as respective sets of data values (namely, as a set of new quantile estimates $S_t(i)=\{S_t(1), \ldots, S_t(K)\}$ and a set of new probabilities $p_t(i)=\{p_t(1), \ldots, p_t(K)\}$.

In one embodiment, for example, the new quantile estimates $S_t(i)$ and the new probabilities $p_t(i)$ may be stored by storing the approximation of the new distribution function.

The storage of new quantile estimates $S_t(i)$ and new probabilities $p_t(i)$ of the new distribution function enables queries for quantile estimates $S_t(i)$ to be answered. A method according to one embodiment for responding to queries of quantile estimates using the approximation of the new distribution function is depicted and described with respect to FIG. 8.

At step 416, new derivative estimates $f_t(i)$ associated with new quantile estimates $S_t(i)$ are determined.

In one embodiment, new derivative estimates $f_t(i)$ may be determined as follows: $f_t(i)=(1-w_s)f_{t-1}(i)+w_t I(|x_t-S_t(i)|\leq c)/\{2c\}$, where c is a tunable parameter representing the window size around each of the new quantile estimates $S_t(i)$ for which the respective new derivative estimates $f_t(i)$ are determined.

The window sizes c may be set to any suitable values. In one embodiment, for example, the window sizes c each are a fraction of the estimated inter-quantile range, and the window sizes c are the same for all quantiles. In another embodiment, for example, the values of window sizes c are set such that the window sizes c are not uniform across all quantiles.

It will be appreciated that, since the new derivative estimates $f_t(i)$ are not required for use in responding to queries for quantile estimates $S_t(i)$, determining the new derivative estimates may be viewed as an extraneous step required for purposes of performing method 400. In one embodiment, as depicted in FIG. 4, this step may be considered as a post-processing step (e.g., performed after the approximation of the new distribution function is determined in order to obtain the derivative estimates associated with current time t which are to be used as the initial derivative estimates the next time method 400 is executed). In one embodiment, not depicted in FIG. 4, this step may be considered as a pre-processing step (e.g., performed before the initial distribution function is determined in order to obtain the derivative estimates associated with current time t which are to be used as the initial derivative estimates the next time method 400 is executed).

At step 418, method 400 ends.

Although depicted and described as ending, it will be appreciated that method 400 may be executed for each new insertion record that is received for purposes of incrementally updating quantile estimates.

The multiple-quantile SA-based incremental quantile estimation capability depicted and described herein may utilize multiple types of weights $w_t$ in updating the initial distribution function to form the new distribution function. For example, the weights $w_t$ may be diminishing (e.g., $w_t=1/t$) or constant ($w_t=w$), or set in any other suitable manner.

For diminishing weights $w_t$ set as $w_t=1/t$, it will be appreciated that the total weights value $D_t$ is the ratio of deletes in the data. Assuming that this is true for t−1, and further assuming that there are k deletions, then, with the arrival of insertion data value $x_t$, $\hat{F}_{t-1}(x)$ is the weighted sum of $\hat{F}_{t-1}(x)$ and $I(x \geq x_t)$ with weights $(t-k-1)/(t-k)$ and $1/(t-k)$, and the total weights value $D_t=k/(t+1)$ is actually the ratio of deletes in the data up to time t. It also will be appreciate that this may be verified for the deletion and correction equations. In one such embodiment, the actual weight given to insertion data value $x_t$ is $1/(t-k)$, not the intended weight $1/t$.

For constant weights $w_t$ set as $w_t=w$ (where w is positive), let $s_1 < s_2 < \ldots < s_k$ be the index of the data that are deleted until time t, where k is the total number of deletes before time t. With the arrival of insertion data value $x_t$, it can be shown that the total weights value $D_t$ may be represented by $D_t=(1-w)_{t-s_1}^{1-1}w+(1-w)_{t-s_2}^{2-1}w+ \ldots +(1-w)_{t-s_k}^{k-1}w$.

It will be appreciated that the weights $w_t$ used in updating the initial distribution function to form the new distribution function, as depicted and described with respect to FIG. 4, may be set in any other suitable manner.

The multiple-quantile SA-based incremental quantile estimation capability uses an incremental distribution approximation by interpolating at the updated quantile points. As a result, local to the quantile points the incremental distribution approximation is the same linear function as in the single-quantile SA-based incremental quantile estimation capability, whereas globally the incremental distribution approximation is an increasing function.

The multiple-quantile SA-based incremental quantile estimation capability opens up the possibility of using other more elaborate interpolation or approximation schemes given the local approximations at the quantile points. The multiple-quantile SA-based incremental quantile estimation capability also opens up the possibility of using an asymptotic model to overcome some of the instabilities of SA-based incremental quantile estimation schemes in dealing with extreme tails (e.g., due to very small derivatives associated with extreme tails). It will be appreciated that care must be taken to ensure that utilizing such interpolation or approximation schemes does not lead to biases in quantile estimates (e.g., such as where using linear interpolation by connecting quantile points directly without using the local derivatives provides convergence for stationary data, but with a bias).

The multiple-quantile SA-based incremental quantile estimation capability enables the updated quantile estimates to be computed relatively efficiently, while at the same time providing good approximations of quantile estimates.

With respect to the multiple-quantile SA-based incremental quantile estimation capability, it will be appreciated that, since the distribution approximation is piecewise linear, finding the quantile points of the function for updating (as in step 412) is relatively simple (e.g., by determining which line segment each probability p(i) falls into and then solving p(i) for that line segment).

With respect to the multiple-quantile SA-based incremental quantile estimation capability, it will be further appreciated that the estimated derivative $f_t$ is a vector of estimated derivatives (density) and that it is not crucial to obtain exact values of the derivatives. For example, if estimated derivative $f_t$ is replaced by a vector of fixed positive constants, the quantile estimates derived using the SA-based incremental quantile estimation capability still provide good approximations; however, it is more efficient to use a value of estimated derivative $f_t$ that is close to the actual derivatives of the distribution function since the quantile estimates will stabilize faster around the true value.

Although primarily depicted and described herein such that distribution functions are said to include one or more quantile estimates and associated one or more probabilities, it will be appreciated by those skilled in the art and informed by the teachings herein that the distribution functions also may be said to be represented by one or more quantile estimates and associated one or more probabilities (as well as associated one or more derivative estimates associated with the one or more quantile estimates).

Although primarily depicted and described herein with respect to embodiments in which the SA-based incremental quantile estimation capability is utilized for incrementally approximating a distribution function $F_t(\cdot)$ that is a strictly increasing continuous distribution, other embodiments of the SA-based incremental quantile estimation capability may be utilized for incrementally approximating a distribution function $F_t(\cdot)$ that is a discrete distribution. In such embodiments, the SA-based incremental quantile estimation capability may be modified in order to prevent the derivative estimates from becoming infinite. The SA-based incremental quantile estimation capability may be modified in any suitable manner (e.g., by adding a small random noise to the data, where the small random noise may be chosen in a data dependent fashion).

The SA-based incremental quantile estimation capability depicted and described herein enables incremental quantile estimation to be performed for data with stationary distributions and data with non-stationary distributions. For stationary data ($\hat{F}_t$ is stationary), the single-quantile SA-based incremental quantile estimation capability leads to convergence for both diminishing weights and constant weights. For diminishing weights, convergence using single-quantile SA-based incremental quantile estimation capability is to the true quantile in probability one. For constant weights, convergence using the single-quantile SA-based incremental quantile estimation capability is in distribution to a random variable with mean of the true quantile. These convergence results also are true for the multiple-quantile SA-based incremental quantile estimation capability depicted and described herein. For diminishing weights, as t approaches infinity, the SA-based incremental quantile estimations depicted and described herein will converge to true quantiles. For constant weights, as t approaches infinity, the SA-based incremental quantile estimations depicted and described herein will converge in distribution to a random variable with mean of the true quantile. In one embodiment, for non-stationary data (i.e., $\hat{F}_t$ is non-stationary), the SA-based incremental quantile estimation capability will use constant weights ($w_t=w$) as opposed to diminishing weights ($w_t=1/t$).

With respect to the SA-based incremental quantile estimation capability, in the case of deletions and corrections for stationary data that will result in equilibrium, for example, when the deletes occurs at a lag with a stationary random distribution, the estimated quantiles converge to the true quantiles. A heuristic understanding of this convergence is that the insertion, deletion, and correction equations depicted and described herein are designed in such a way that the effect of deleted data is diminished in the functional approximation of $\hat{F}_t(x)$, and thus quantiles of the remaining data will have the correct quantiles.

With respect to the SA-based incremental quantile estimation capability, in the embodiments described hereinabove data correction was considered to be a special data operation; however, in other embodiments data correction may be interpreted or handled as being a deletion of old data followed by a reinsertion of a new data value at the old time index. In contrast, for a data update, the insertion occurs at the current time. For diminishing weights (1/t) and stationary data, this different is not important as every valid data point has an equal weight no matter the age of the data; however, for constant weights (w) with non-stationary data this different is important since recent data will have a higher weight than older data.

Although primarily depicted and described herein with respect to embodiments in which estimated quantiles are updated for each new insertion record that is received (i.e., for each new data value $x_t$ that is received), in other embodiments estimated quantiles may be updated using a batch of M insertion records (i.e., a batch of M data values $\{x_t\}_m$). In such embodiments, for example, steps 204-208 of method 200 and steps 404-408 of method 400 are performed for each of the M data values, and then steps 210-214 of method 200 and steps 410-414 of method 400 are performed once for the batch of M data values using the new distribution function that reflects the M data values. It will be appreciated that the various methods (e.g., methods 200 and 400 of FIG. 2 and FIG. 4, respectively, among others) may be modified in other ways to support batch processing of data records.

Although primarily depicted and described herein within the context of embodiments in which four types of data records are supported (namely, insertions, deletions, corrections, and updates), it will be appreciated that the SA-based incremental quantile estimation capability depicted and described herein may utilized in other embodiments in which fewer or more data record types are supported and/or other record types are supported. For example, the SA-based incremental quantile estimation capability may be utilized in embodiments in which only data insertions and data deletions are supported. For example, the SA-based incremental quantile estimation capability may be utilized in embodiments in which only data insertions, data deletions, and data updates are supported. Furthermore, it will be appreciated that the types of records that are included in the set of data records for which the SA-based incremental quantile estimation capability is implemented may be dependent on the application for which the SA-based incremental quantile estimation capability is used (e.g., database applications, networking applications, and the like).

Figure 8:
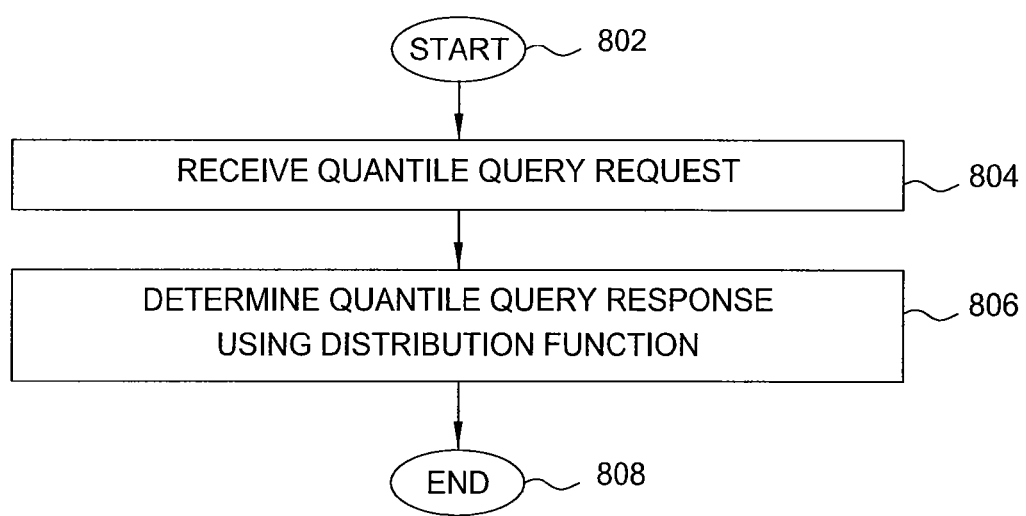
FIG. 8 depicts one embodiment of a method for responding to queries using a distribution function for which the quantile estimates are incrementally tracked.

FIG. 8 depicts one embodiment of a method for responding to queries using a distribution function for which the quantile estimates are incrementally tracked. Although primarily depicted and described herein as being performed serially, at least a portion of the steps of method 800 may be performed contemporaneously, or in a different order than depicted and described with respect to FIG. 8.

At step 802, method 800 begins.

At step 804, a quantile query request is received.

The quantile query request may be any quantile query request. For example, the quantile query request may be a request for a quantile for a specific value, a request for a quantile for a range of values (e.g., for a portion of a bin, multiple bins, a range of values spanning multiple bins, and the like, as well as various combinations thereof).

The quantile query request may be received from any source. For example, the quantile query request may be received locally at the system performing incremental quantile estimation, received from a remote system in communication with the system performing incremental quantile estimation, and the like, as well as various combinations thereof.

The quantile query request may be initiated in any manner. For example, the quantile query request may be initiated manually by a user, automatically by a system, and the like, as well as various combinations thereof.

At step 806, a quantile query response is determined using a distribution function. As described herein, the distribution function is being updated in real time or near real time as data values are being received and, thus, the distribution function provides an accurate estimate of the current view of the quantile distribution. Thus, the quantile query response provides a current value of the quantile of the data value(s) for which the quantile query request was initiated.

At step 808, method 800 ends.

Although depicted and described as ending (for purposes of clarity), it will be appreciated that method 800 of FIG. 8 may be executed as often as desired/necessary for the application for which the incremental quantile estimation capability is being used.

Figure 9:
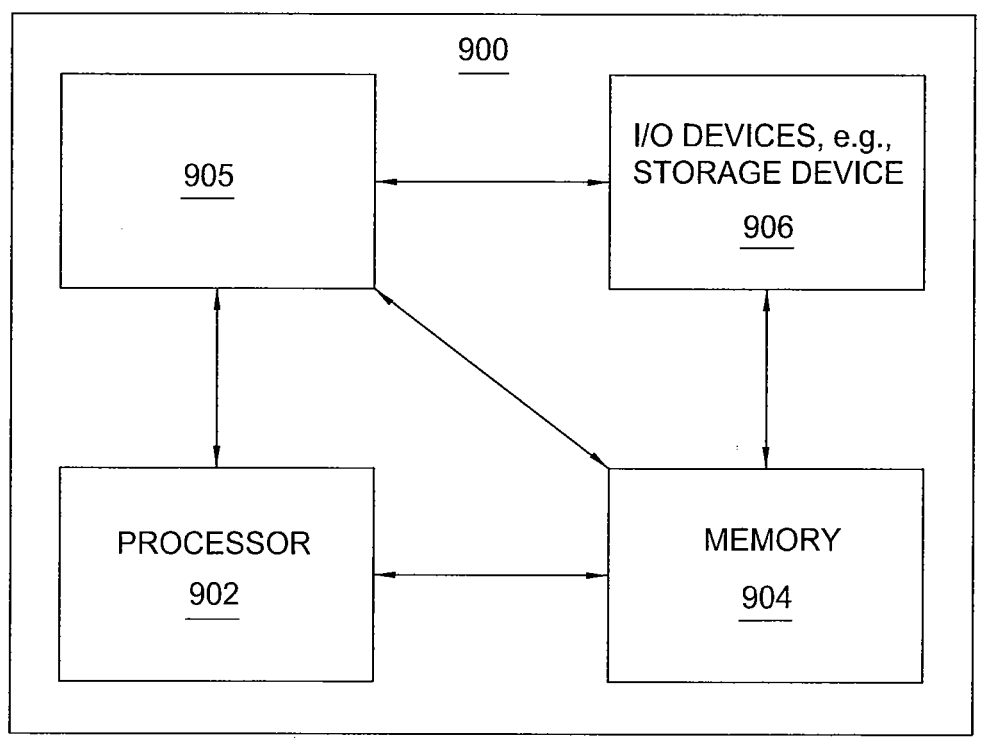
FIG. 9 depicts a high-level block diagram of a general-purpose computer suitable for use in performing the functions described herein.

FIG. 9 depicts a high-level block diagram of a general-purpose computer suitable for use in performing the functions described herein. As depicted in FIG. 9, system 900 comprises a processor element 902 (e.g., a CPU), a memory 904, e.g., random access memory (RAM) and/or read only memory (ROM), a incremental quantile estimation module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the incremental quantile estimation process 905 can be loaded into memory 904 and executed by processor 902 to implement the functions as discussed above. As such incremental quantile estimation process 905 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
using a processor and a memory for:
receiving a first data record of a first record type and a second data record of a second record type; and
updating a quantile distribution comprising a quantile point, wherein the quantile point is defined by a quantile and a probability associated with the quantile, wherein updating the quantile distribution comprises:
updating the probability of the quantile point, based on the first record type of the first data record and the second record type of the second data record, to obtain a new probability for the quantile of the quantile point.

2. The method of claim 1, wherein the first data record is an insertion record, wherein the second data record is a deletion record or a correction record.

3. The method of claim 1, wherein updating the probability of the quantile point to obtain the new probability for the quantile of the quantile point comprises:
updating the probability of the quantile point to obtain an intermediate probability based on the first record type of the first data record; and
updating the intermediate probability to obtain the new probability for the quantile of the quantile point based on the second record type of the second data record.

4. The method of claim 3, wherein the first data record is an insertion record, wherein updating the probability of the quantile point to obtain the intermediate probability based on the first record type of the first data record is performed using:

$$p_t^{INT} \leftarrow (1-D_{t-1}(1-w_t))^{-1}((1-D_{t-1})p_{t-1}+w_t I(S_{t-1} \geq x_t)),$$

wherein:
$x_t$ is a value of the first data record;
$w_t$ is a weight associated with the value $x_t$;
$S_{t-1}$ is the quantile of the quantile point;
$p_{t-1}$ is the initial probability associated with the initial quantile $S_{t-1}$;
$I(S_{t-1} \geq x_t)$ is an indicator function;
$D_{t-1}$ is a total weight value; and
$p_t^{INT}$ is the intermediate probability associated with the quantile $S_{t-1}$.

5. The method of claim 4, further comprising:
computing a new total weights value from the total weights value using:

$$D_t \leftarrow (1-w_t)D_{t-1},$$

wherein:
  $w_t$ is the weight associated with the value $x_t$;
  $D_{t-1}$ is the total weights value; and
  $D_t$ is the new total weights value.

6. The method of claim 4, wherein the second data record is a deletion record, wherein updating the intermediate probability to obtain the new probability for the quantile of the quantile point based on the second record type of the second data record is performed using:

$$p_t \leftarrow (1-D_t^{INT}-d_{t_0})^{-1}((1-D_t^{INT})p_t^{INT}-d_{t_0}I(S_{t-1} \geq x_{t_0})),$$

wherein:
  $x_{t_0}$ is a data value to be deleted;
  $d_{t_0}$ is a weight of the data value to be deleted;
  $D_t^{INT}$ is an intermediate total weights value;
  $S_{t-1}$ is the quantile of the quantile point;
  $p_t^{INT}$ is the intermediate probability associated with the quantile $S_{t-1}$;
  $I(S_{t-1} \geq x_{t_0})$ is an indicator function; and
  $p_t$ is the new probability associated with the quantile $S_{t-1}$.

7. The method of claim 4, wherein the second data record is a correction record, wherein updating the intermediate probability to obtain the new probability for the quantile of the quantile point based on the second record type of the second data record is performed using:

$$p_t \leftarrow (d_{t_1}(I(S_{t-1} \geq x_{t_1})-I(S_{t-1} \geq x'_{t_1}))+(1-D_t^{INT})p_t^{INT})(1-D_t^{INT})^{-1},$$

wherein:
  $x_{t_1}$ is an original data value to be updated and $x'_{t_1}$ is a new data value to replace the original data value to be updated;
  $d_{t_1}$ is a weight of the original data value to be updated;
  $D_t^{INT}$ is an intermediate total weights value;
  $S_{t-1}$ is the quantile of the quantile point;
  $p_t^{INT}$ is the intermediate probability associated with the quantile $S_{t-1}$;
  $I(S_{t-1} \geq x'_{t_1})$ is an indicator function; and
  $p_t$ is the new probability associated with the quantile $S_{t-1}$.

8. The method of claim 4, further comprising:
updating the total weights value to obtain an intermediate total weights value using $D_t^{INT} \leftarrow (1-w_t)D_{t-1}$, wherein $w_t$ is the weight associated with the value $x_t$, $D_{t-1}$ is the total weights value, and $D_t^{INT}$ is the intermediate total weights value.

9. The method of claim 8, further comprising:
when the second data record is a deletion record, updating the intermediate total weights value to obtain a new total weights value using $D_t \leftarrow D_t^{INT}+d_{t_0}(t)$, wherein $D_t^{INT}$ is the intermediate total weights value, $d_{t_0}(t) = w_{t_0}\Pi_{s=t_0+1}^{t}(1-w_s)$, and $D_t$ is the new total weights value.

10. The method of claim 8, further comprising:
when the second data record is a correction record, using the intermediate total weights value as a new total weights value $D_t$.

11. The method of claim 1, further comprising:
updating the quantile based on an approximation of the quantile distribution at or near a quantile point defined based on the quantile and the new probability for the quantile.

12. The method of claim 11, wherein updating the quantile based on the approximation of the quantile distribution at or near the quantile point defined based on the quantile and the new probability for the quantile comprises:
generating the approximation of the quantile distribution at or near the quantile point defined based on the quantile and the new probability for the quantile; and
determining a new quantile associated with the new probability using the approximation of the quantile distribution.

13. The method of claim 12, wherein the approximation of the quantile distribution at or near the quantile point defined based on the quantile and the new probability for the quantile is a local linear approximation of the quantile point defined based on the quantile and the new probability for the quantile.

14. The method of claim 12, wherein the approximation of the quantile distribution at or near the quantile point defined based on the quantile and the new probability for the quantile is generated using a linear function having a slope defined by a density value associated with the quantile.

15. The method of claim 14, further comprising:
updating the density value associated with the quantile to obtain a new density value using:

$$f_t = (1-w_t)f_{t-1}+w_t I(|x_t-S_t| \leq c)/\{2c\},$$

wherein:
  $x_t$ is a value of the first data record;
  $w_t$ is a weight associated with the value $x_t$;
  $S_t$ is the new quantile;
  $f_{t-1}$ is the density value associated with the quantile $S_{t-1}$;
  $I(|x_t-S_{t-1}| \leq c)$ is an indicator function;
  $c$ is a tunable parameter representing a window size around the new quantile $S_t$; and
  $f_t$ is the new density value associated with the new quantile $S_t$.

16. The method of claim 12, wherein the quantile point defined based on the quantile and the new probability for the quantile is a first quantile point, the quantile is a first quantile, and the new probability is a first new probability, wherein generating the approximation of the distribution function at or near the first quantile point defined based on the first quantile and the first new probability comprises:
defining a right quantile point ($\text{right}_t(i)$) to the right of the first quantile point ($S_{t-1}(i)$, $p_t(i)$);
defining a left quantile point ($\text{left}_t(i+1)$) to the left of a second quantile point ($S_{t-1}(i+1)$, $p_t(i+1)$) defined based on a second quantile and a second new probability; and
connecting the first quantile point ($S_{t-1}(i)$, $p_t(i)$), the right quantile point ($\text{right}_t(i)$), the left quantile point ($\text{left}_t(i+1)$), and the second quantile point ($S_{t-1}(i+1)$, $p_t(i+1)$).

17. The method of claim 16, wherein:
defining the right quantile point ($\text{right}_t(i)$) is performed using $$\text{right}_t(i) = (S_{t-1}(i)+\Delta_t(i), p_t(i)+f_{t-1}(i)),$$

wherein
  $S_{t-1}(i)$ is the first quantile;
  $p_t(i)$ is the first new probability associated with the first quantile $S_{t-1}(i)$;

$f_{t-1}(i)$ is a density value associated with the first quantile $S_{t-1}(i)$; and $\Delta_t(i)$ is a monotonicity value; and defining the left quantile point ($\text{left}_t(i+1)$) is performed using $$\text{left}_t(i+1)=(S_{t-1}(i+1)-\Delta_t(i), p_t(i+1)-f_{t-1}(i+1)\Delta_t(i)),$$

wherein:

$S_{t-1}(i+1)$ is the second quantile;

$p_t(i+1)$ is the second new probability associated with the second quantile $S_{t-1}(i+1)$;

$f_{t-1}(i+1)$ is a density value associated with the second quantile $S_{t-1}(i+1)$; and $\Delta_t(i)$ is the monotonicity value.

18. The method of claim 12, wherein determining the new quantile associated with the new probability using the approximation of the distribution function comprises:

evaluating the approximation of the quantile distribution at the new probability to determine the new quantile.

19. An apparatus, comprising:

a processor and a memory communicatively connected to the processor, the processor configured to:

receive a first data record of a first record type and a second data record of a second record type; and update a quantile distribution comprising a quantile point, wherein the quantile point is defined by a quantile and a probability associated with the quantile, wherein the processor is configured to update the quantile distribution by:

updating the probability of the quantile point, based on the first record type of the first data record and the second record type of the second data record, to obtain a new probability for the quantile of the quantile point.

20. A non-transitory computer-readable storage medium storing instructions which, when executed by a computer, cause the computer to perform a method comprising:

receiving a first data record of a first record type and a second data record of a second record type; and updating a quantile distribution comprising a quantile point, wherein the quantile point is defined by a quantile and a probability associated with the quantile, wherein updating the quantile distribution comprises:

updating the probability of the quantile point, based on the first record type of the first data record and the second record type of the second data record, to obtain a new probability for the quantile of the quantile point.

* * * * *